United States Patent
Emmanuel

(10) Patent No.: US 8,325,710 B2
(45) Date of Patent: Dec. 4, 2012

(54) INLINE POWER SYSTEM AND METHOD FOR NETWORK COMMUNICATIONS

(75) Inventor: Oliver Rex Anto Emmanuel, Oakville (CA)

(73) Assignee: Phybridge Inc., Mississauga (CA)

( * ) Notice: Subject to any disclaimer, the term of this patent is extended or adjusted under 35 U.S.C. 154(b) by 1425 days.

(21) Appl. No.: 11/889,148

(22) Filed: Aug. 9, 2007

(65) Prior Publication Data
US 2009/0041004 A1    Feb. 12, 2009

(51) Int. Cl.
H04L 12/66 (2006.01)
H04B 1/16 (2006.01)
H04B 1/38 (2006.01)
H04M 11/00 (2006.01)
G06F 1/00 (2006.01)

(52) U.S. Cl. ............ 370/352; 455/343.1; 455/572; 379/90.01; 379/102.04; 713/300

(58) Field of Classification Search ......... 370/241, 370/351–356, 400, 401, 464–467, 493–495; 709/250; 455/127.1, 343.1, 572; 379/102.04, 379/322, 395.01; 713/300
See application file for complete search history.

(56) References Cited

U.S. PATENT DOCUMENTS

| | | | |
|---|---|---|---|
| 7,031,454 B1 * | 4/2006 | Stelman | 379/387.01 |
| 2005/0078690 A1 * | 4/2005 | DeLangis | 370/401 |
| 2005/0083959 A1 * | 4/2005 | Binder | 370/419 |
| 2006/0018310 A1 * | 1/2006 | Stevens et al. | 370/356 |
| 2008/0168283 A1 * | 7/2008 | Penning | 713/310 |
| 2009/0003373 A1 * | 1/2009 | Morrissey et al. | 370/445 |
| 2009/0213742 A1 * | 8/2009 | French et al. | 370/252 |

* cited by examiner

Primary Examiner — Chandrahas Patel
Assistant Examiner — Joel Hamel
(74) Attorney, Agent, or Firm — Grant Tisdall; Gowling Lofteur Henderson LLP

(57) ABSTRACT

An adapter and method for coupling an inline powered communications device to a primary network and to a secondary network, the communications device configured for having an assigned device identification and configurable for using an assigned network address for use in routing data over at least one of the networks. The adapter and method comprise a first port for connecting to the communications device to facilitate the communication of the data and inline power between the adapter and the communications device, the inline power for use in operating the communications device. The adapter and method comprise a second port for connecting to the primary network to facilitate the communication of the data between the primary network and the communications device via the first port, the second port coupled to the first port, and a third port for connecting to the secondary network to facilitate the supply of the inline power between the secondary network and the communications device via the first port, the second port coupled to the first port. The adapter and method also comprise a power coupling module configured for providing a transmission path of the inline power between the first port and the third port when the inline power is unavailable from primary network via the second port.

28 Claims, 21 Drawing Sheets

INLINE POWER SYSTEM AND METHOD FOR NETWORK COMMUNICATIONS

BACKGROUND

Migration to IP Telephony requires upgrading the network switches to support POE, bandwidth etc. As this transition is happening, network outage will take place. Disruption and delay caused by a network outage results in loss of critical communication such as IP Telephony as well as a significant cost to the organization experiencing the network outage. A power outage or loss of electricity supply can be another interruption to critical equipment such as IP Telephony.

IP Telephony deployment is gaining momentum, however, IP Telephones require power that can be sourced from a traditional power adaptor. A relatively new mechanism for delivering power is over the Ethernet cable or other acceptable inline power mechanisms. This method is well known in the industry and is called Power-Over-Ethernet (POE). The equipment sourcing the power is known as the Power-Sourcing-Equipment (PSE) and the device drawing power is known as the Powered Device (PD). Typical examples of PDs are IP Telephones and remote cameras.

However, retrofitting of existing cabling for data communication to provide power to powered devices via POE can be expensive. Further, it is crucial to keep lines of communications alive at all times. There are instances that stall or disrupt the continuous service that these communications provide. A network outage is an interruption in availability of the system due to a communication failure of the network. Reasons for a network outage are switch failure, network overload and migration to IP Telephony.

SUMMARY

Retrofitting of existing cabling for data communication to provide power to powered devices via POE can be expensive. Further, it is crucial to keep lines of communications alive at all times. There are instances that stall or disrupt the continuous service that these communications provide. A network outage is an interruption in availability of the system due to a communication failure of the network. Reasons for a network outage are switch failure, network overload and migration to IP Telephony. Contrary to current systems, there is provided an adapter and method for coupling an inline powered communications device to a primary network and to a secondary network, the communications device configured for having an assigned device identification and configurable for using an assigned network address for use in routing data over at least one of the networks. The adapter and method comprise a first port for connecting to the communications device to facilitate the communication of the data and inline power between the adapter and the communications device, the inline power for use in operating the communications device. The adapter and method comprise a second port for connecting to the primary network to facilitate the communication of the data between the primary network and the communications device via the first port, the second port coupled to the first port, and a third port for connecting to the secondary network to facilitate the supply of the inline power between the secondary network and the communications device via the first port, the second port coupled to the first port. The adapter and method also comprise a power coupling module configured for providing a transmission path of the inline power between the first port and the third port when the inline power is unavailable from primary network via the second port.

One aspect provided is an adapter for coupling an inline powered communications device to a primary network and to a secondary network, the communications device configured for having an assigned device identification and configurable for using an assigned network address for use in routing data over at least one of the networks, the adapter comprising: a first port for connecting to the communications device to facilitate the communication of the data and inline power between the adapter and the communications device, the inline power for use in operating the communications device; a second port for connecting to the primary network to facilitate the communication of the data between the primary network and the communications device via the first port, the second port coupled to the first port; a third port for connecting to the secondary network to facilitate the supply of the inline power between the secondary network and the communications device via the first port, the second port coupled to the first port; and a power coupling module configured for providing a transmission path of the inline power between the first port and the third port when the inline power is unavailable from primary network via the second port.

A method for coupling an inline powered communications device to a primary network and to a secondary network, the communications device configured for having an assigned device identification and configurable for using an assigned network address for use in routing data over at least one of the networks, the method comprising the acts of: connecting to the communications device via a first port to facilitate the communication of the data and inline power between an adapter and the communications device, the inline power for use in operating the communications device; connecting to the primary network via a second port to facilitate the communication of the data between the primary network and the communications device via the first port, the second port coupled to the first port; connecting to the secondary network via a third port to facilitate the supply of the inline power between the secondary network and the communications device via the first port, the second port coupled to the first port; and providing a transmission path of the inline power between the first port and the third port when the inline power is unavailable from primary network via the second port.

BRIEF DESCRIPTION OF THE DRAWINGS

These and other features will become more apparent in the following detailed description in which reference is made to the appended drawings by way of example only, wherein:

FIG. 5b shows an embodiment of the power discovery module of the adapter of FIG. 5a;

FIG. 5c shows an example of a power supply to the adapter components of FIG. 5a;

FIG. 6 shows an example operation of the power discovery module of FIG. 5a;

FIG. 7b is one embodiment of the control unit of FIG. 7a;

DESCRIPTION

VoIP Communications Environment 10

Figure 1:
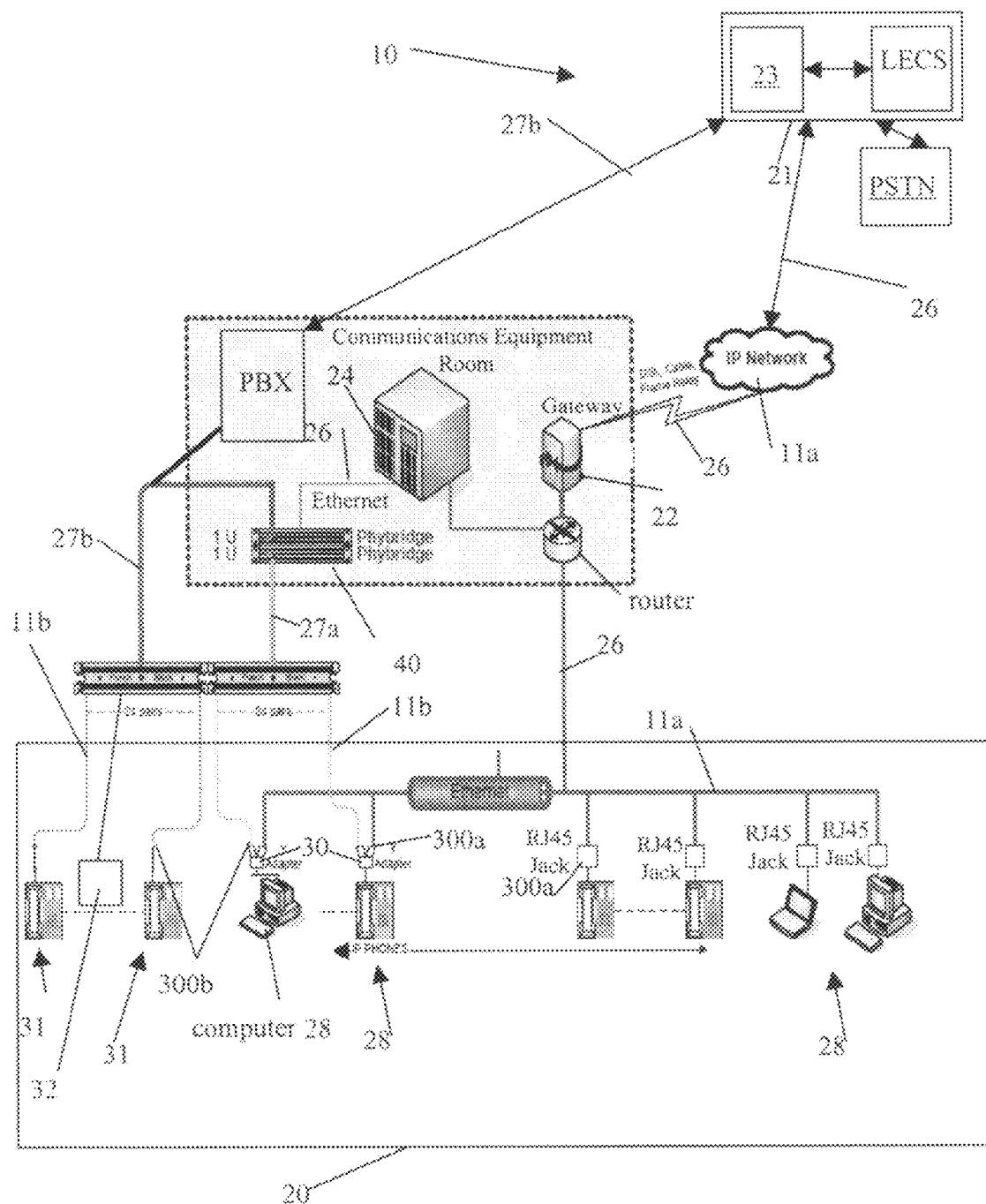
FIG. 1 is a block diagram of a communications environment.

Referring to FIG. 1, shown are communications environments 10, 20 that facilitate communication of packet-based call data 26 (e.g. voice and/or voice with associated video data—one embodiment of the data 26) over a packet-based data communications network 11*a* (e.g. a Wide Area Network WAN such as the Internet and/or a Local Area Network LAN such as an Ethernet) using packet-based telephony (e.g. IP telephony) with respect to a plurality of communication devices 28 (e.g. IP phones, computers, wired PDAs, etc.) distributed in a local communications environment 20. The communications device 28 is connected to the network 11*a* using a dynamically assigned network 11*a* address (e.g. a virtual telephone number/line, an IP address, a SIP address, etc.) via network jack(s) 300*a* that is used as a temporary (e.g. dynamically assigned) network 11*a* entry point for the communications device 28 (e.g. a call endpoint) for the user's current call session. The communications device 28 is also connected to a telephone network 11*b* (e.g. two-wire legacy phone cables) and/or digital communication (e.g. xDSL) data 27*a* communication formats, via telephone network jack(s) 300*b* that provide the network 11*b* entry point for the communications device 28, as well as for traditional telephones 31 in the communication of telephone data 27*b*, as further described below.

The local environment 20 can communicate with the external communications environment 10 via a network server 22 for packet-based call data 26 and via a PBX for traditional telephone communications 27*b*. It is also recognised that an IP PBX (e.g. an administration server 24) can be used to collect the call data 26 from the communication devices 28 for communication as packet-based call data 26 (in the case of data 27*a* that data is converted into data 26 before communication over the network 11*a*) via the server 22 over the network 11*a*. It is also recognised that a conversion unit 40 can be used to convert any received telephone communications data 27*a* (e.g. in two-wire digital formats—XDSL) collected from the communication devices 28 over the network 11*b* (via a communication mode adapter 30) and convert the format of those communications 27*a* into the format of the packet-based data 26 that is suitable for communication over the network 11*a*, as desired.

Referring again to FIG. 1, it is recognised that the network jack 300*a* (e.g. RJ45 or other LAN compatible connection standard jack) does not have any dedicated telephone lines/numbers (e.g. physical/static telephone number/line), rather the network 11*a* address that is dynamically assigned to the communications device 28 is dependent upon a device ID of the communications device 28, as further described below, rather than the location and/or configuration properties of the network jack 300*a*. Voice over Internet Protocol (also called VoIP), IP Telephony, Internet telephony, Broadband telephony, Broadband Phone and/or Voice over Broadband, for example, is the routing of voice conversations over the Internet or through any other packet-based communications network 11*a*. Companies providing VoIP service can be referred to as VoIP providers, and protocols which are used to carry voice signals over the network 11*a* can be referred to as Voice over IP or VoIP protocols.

In comparison, the Private Branch eXchange (PBX) (as well as the IP PBX being a packet-based version of the POTS based PBX) is a telephone exchange that serves a particular business or office (e.g. environment 20), as opposed to one that a common carrier or telephone company operates for many businesses or for the general public. PBXs operate as a connection between a private organization—usually a business—and a public switched telephone network PSTN. Functionally, the PBX can perform three main duties, namely: establishing connections (circuits) between the telephone sets 31 of two users (e.g. mapping a dialled number to a physical phone 31, ensuring the phone isn't already busy); maintaining such connections as long as the users require them. (i.e. channelling voice signals between the users); and providing information for accounting purposes (e.g. metering calls). In addition to these basic functions, PBXs can provide other calling features and capabilities. Interfaces/protocols for connecting extensions to the PBX include: POTS (Plain Old Telephone System) - the common two-wire interface used in most homes; proprietary—the manufacturer has defined a protocol where one can only connect the manufacturer's sets to their PBX, but with more visible information displayed and/or specific function buttons; and DECT—a standard for connecting cordless phones. Interfaces/protocols for connecting PBXs to trunk lines include: standard POTS (Plain Old Telephone System) lines—the common two-wire interface used in most domestic homes; ISDN—the most common digital standard for fixed telephone 31 devices, supplied in either Basic (2 circuit capacity) or Primary (24 or 30 circuit capacity) versions; and RBS—(Robbed bit signaling) which delivers 24 digital circuits over a four-wire (T1) interface.

In the case of the IP PBX, interfaces/protocols for connecting communication device 28 extensions to the IP PBX (and the network 11*a*) include: Internet Protocol, for example, H.323 and SIP. Interfaces for connecting IP PBXs to trunk lines include Internet Protocol—H.323, SIP, MGCP; and Inter-Asterisk eXchange protocols that operate over IP.

The PBX can be used as a direct telephone communications interface between the communication environments 20 and the PSTN, via a Local Exchange Carrier LEC. For example, the PBX can provide for telephone communications 27*b* (e.g. POTS) between the traditional telephones 31 when using the network 11*b* via the jacks 300*b* and a communication proxy system 21 (e.g. the LEC—and/or an SIP proxy server 23). The traditional telephones 31 are connected to the traditional telephone network 11*b* using the dedicated phone line/number via traditional phone jacks 300*b* (e.g. RJ11 having a statically assigned telephone number/line). As discussed further below, the local environment 20 also has the communication mode adapter 30 that is used to coordinate the coupling (with associated routing of the data 26 and/or the power 25 sourcing) of the communications device 28 to either the communications network 11a or the telephone network 11b, for example, as well as to coordinate the supply of power 25 as appropriate from power sourcing equipment PSE of a control unit 40, see FIGS. 4 and 7a. It is recognised that the sourcing of the power 25 can be independent from the routing of the data 26 with respect to the network 11a and the network 11b through the adapter 30. For example, as further described below, the adapter 30 can facilitate the supply of power 25 from the PSE inline through the network 11b to the communications devices 28, with the corresponding communication of the data 26 either through the network 11a as the data 26, or as the data 27a through the network 11b.

As further described below, environments 10, 20 provide for power 25 used by a plurality of inline (e.g. POE) powered communication devices 28 to be sourced from the central control unit 40 over existing legacy two wire telephony cabling infrastructure (e.g. the network 11b). The central unit 40 is also able to convert and transport data packets 27 over the same network 11b along with the power 25, as desired. The adaptor 30, located at the edge of the network 11b (e.g. at the network jacks 300b), can convert between a 2-wire and Ethernet protocols (e.g. from data 26 to data 27a formats and vice versa), as well as include circuitry and associated logic to extract power 25 supplied/sourced from the control unit 40 and to perform a discovery process 301 (see FIG. 6) of the powered communication devices 28 (e.g. as stipulated in IEEE 802.3af or any other similar standard).

Power Sourcing Equipment PSE

Network 11a Only

Figure 2:
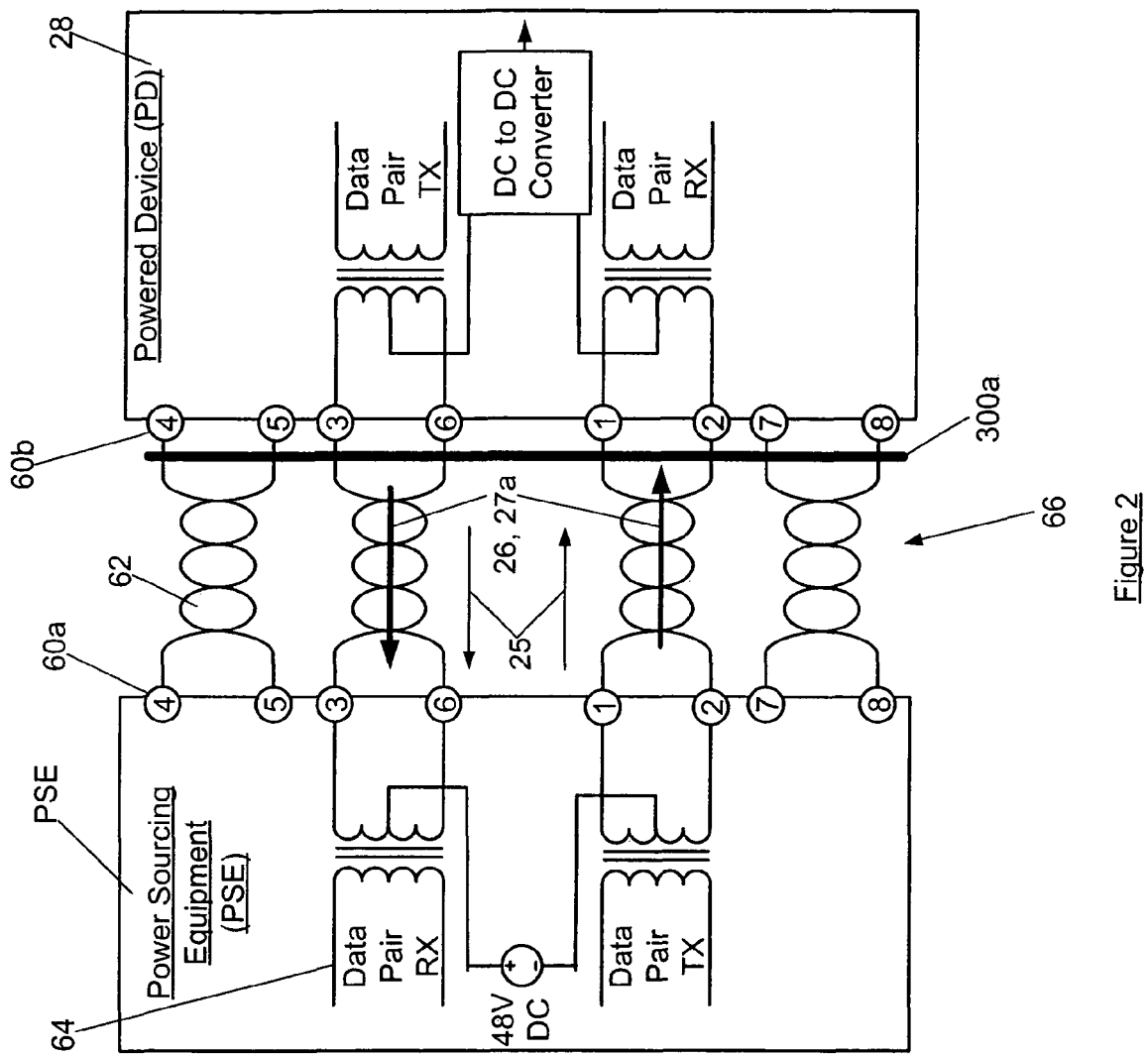
FIG. 2 is a block diagram of an example configuration of PSE of the control unit of FIG. 1.
Figure 3:
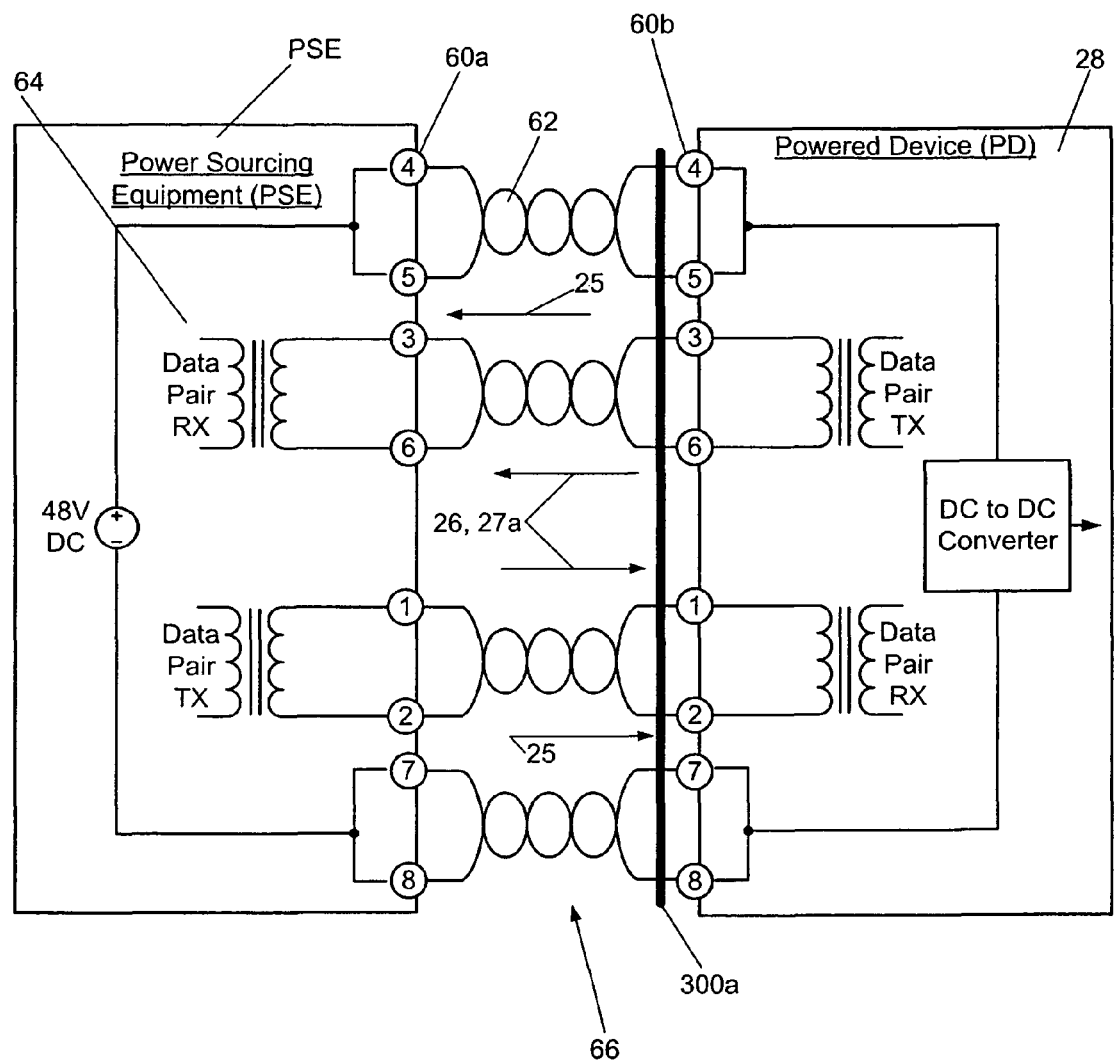
FIG. 3 is a further embodiment of PSE of the control unit of FIG. 1.

Referring to FIG. 2, shown is an example of the power sourcing equipment PSE. The PSE has a number of data pins 60a that are used to connect via wire/conductor pairs 62 (combined as four pairs of an Ethernet compatible cable 66—e.g. 8P8C) to data pins 60b of the communications device 28. The conductor pairs 62 are configured to transmit the data 26 and/or the power 25 used by the communications device 28. For example, shown in FIG. 2 is a PSE having four conductor pairs 62 connecting data pins 1-8 of the PSE with corresponding data pins 1-8 of the communication device 28. Data pins 4-5 and 7-8 can be unused while data pins 3-6 and 1-2 are used to transmit the power 25 over the data pairs, such that the power 25 is superimposed onto the data pins 3-6 and 1-2 via a center tap coupling transformers 64. It is recognised that each pair of data pins 60a,b can also be referred to as a communications port or power connection, as desired. Referring to FIG. 3, the PSE is connected to the communications device 28 for data 26 transfer via pins 3-6 and 1-2, and uses the pins 4-5 and 7-8 to supply the power 25, such that the power 25 is carried over the spare data pin pairs of the Ethernet cable 66. It is noted that in FIGS. 2 and 3, the PSE is connected directly to communications device 28 via the network jack 300a, and as such all power and data 26 communication needs for the communications device 28 are done via the network 11a without use of the adapter 30.

Combined Network 11a and Network 11b

Figure 4:
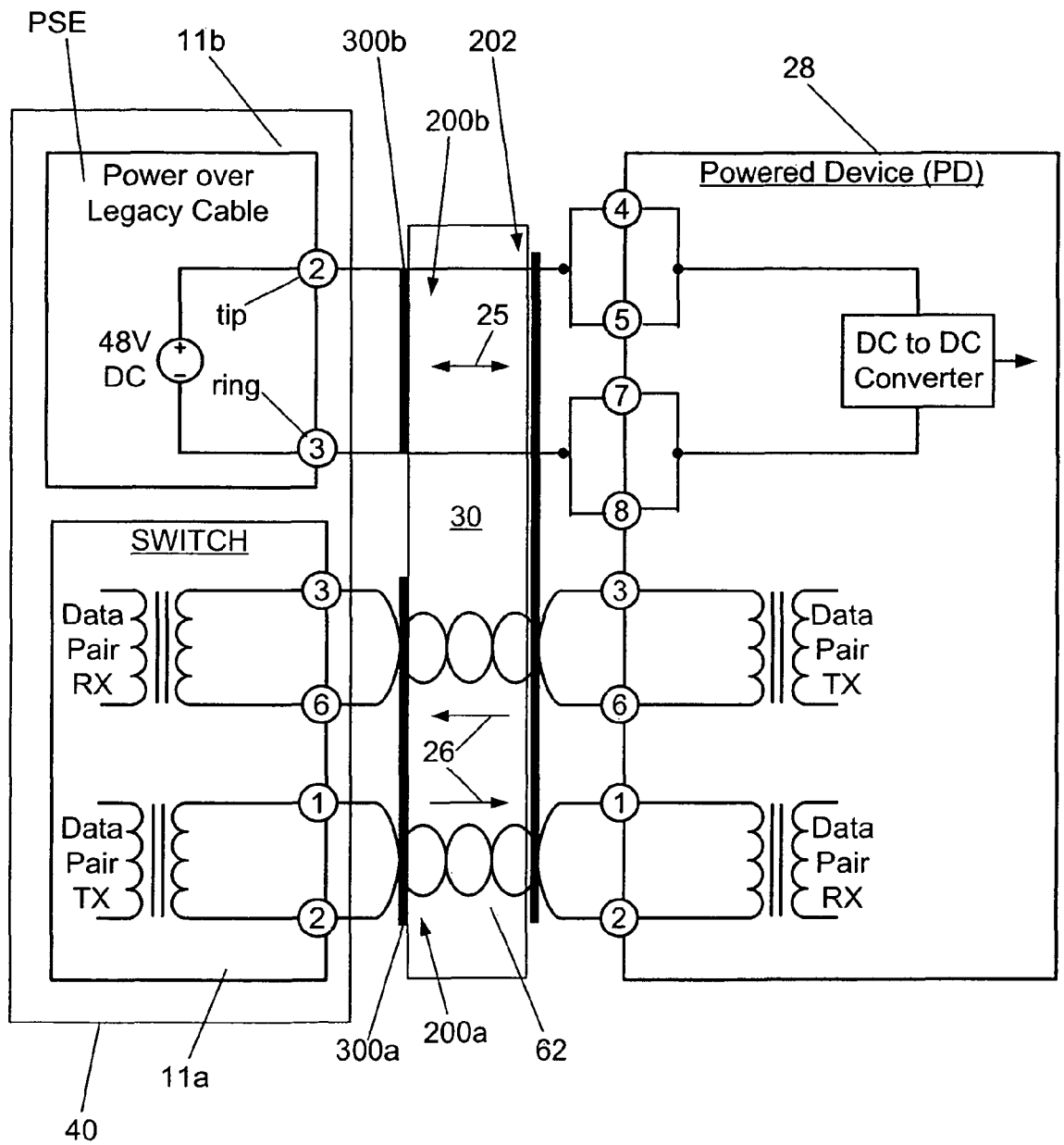
FIG. 4 is a further embodiment of PSE of the control unit and the adapter of FIG. 1.

Referring to FIG. 4, shown is an embodiment of the control unit 40 and the PSE, such that the communications device 28 is connected to the network 11b via the adapter 30. The adapter 30 is connected via port 200a to the network 11a via the network jack 200a and via port 200b to the network 11b via the network jack 200b. As well, the adapter 30 is connected to the communication device 28 via a port 202. As shown by example, the power 25 to and from the communication device 28 is transmitted over the network 11b (from the PSE using the tip and ring wire-pair conductors of the network 11b) while the data 26 to and from the communication device 28 is communicated over the network 11a. Accordingly, the port 202 is used to provide both data 26 and power 25 capabilities with respect to the device 28, while the port 200a is used for data 26 communications, and the port 200b is used separately for the power 25 requirements of the device 28. As further discussed below with respect to FIGS. 9a,b, the adapter 30 is used to facilitate the supply of the power 25 and optionally the data 27a communication for the communications device 28 via the network 11b.

Network 11b Only

Figure 5A:
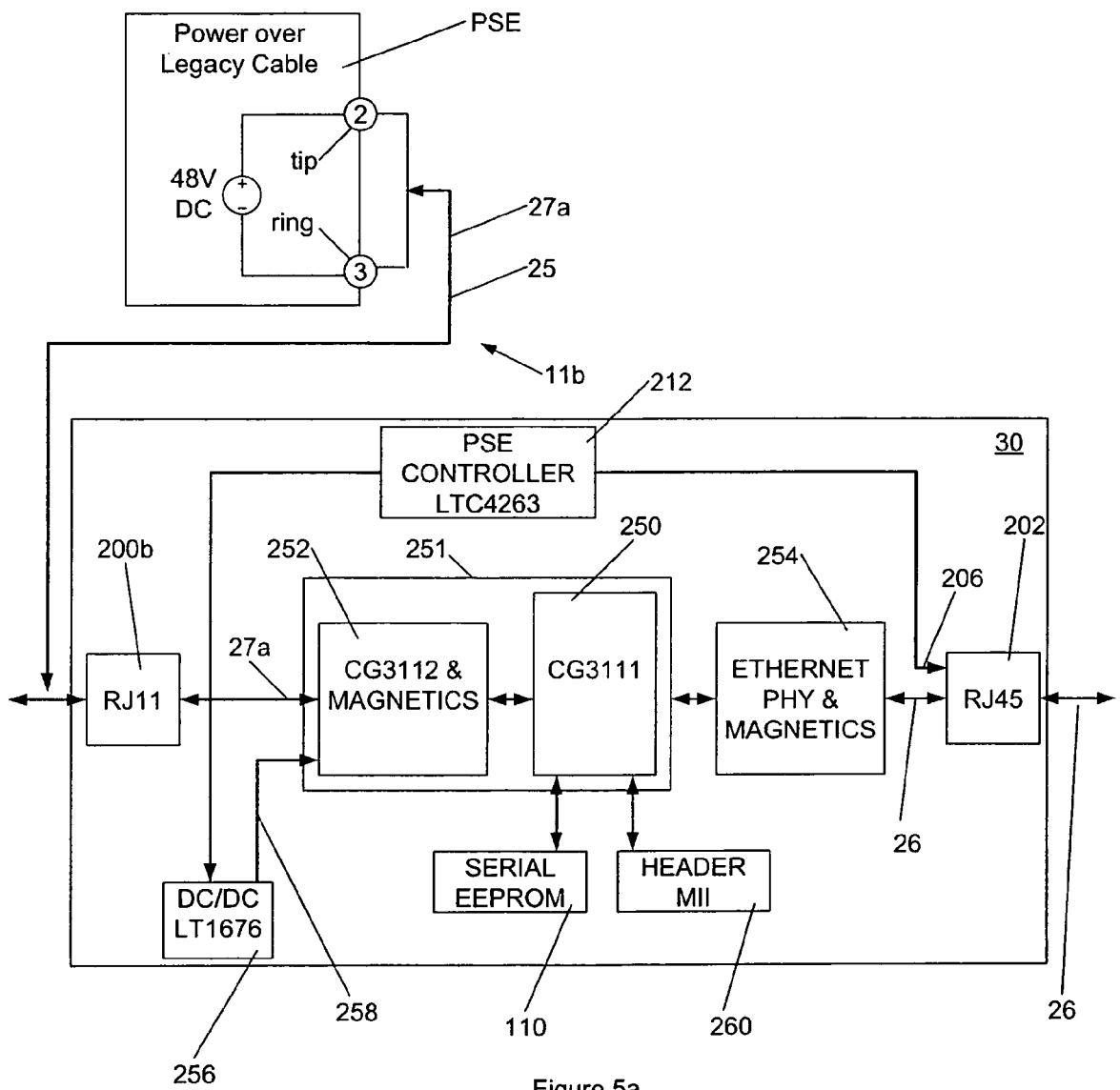
FIG. 5a is a block diagram of a further embodiment of the adapter of FIG. 1.
Figure 5B:
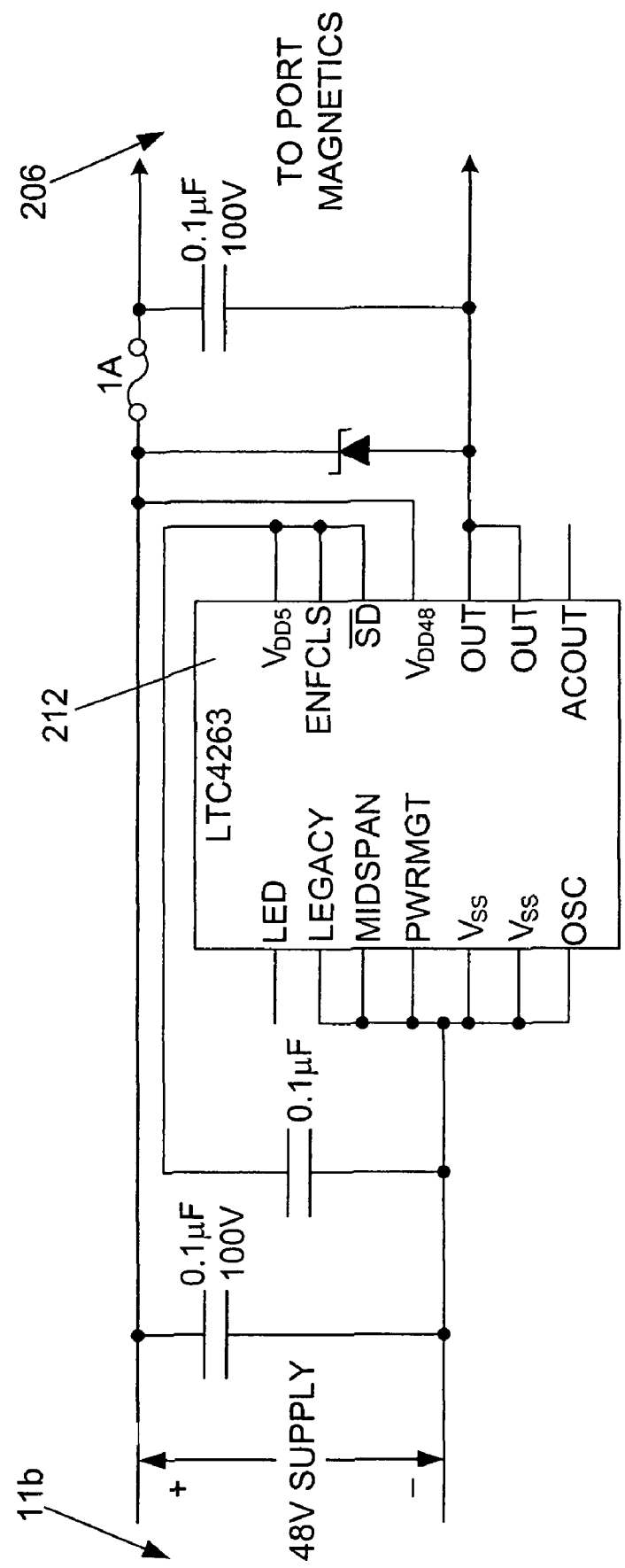

Referring to FIG. 5a, shown is an embodiment of the PSE combined with the adapter 30 that is connected to the network 11b via the network port 200b and to the communications device 28 via the port 202, such that all data 26, 27a and power 25 capabilities are done with respect to the communications device 28 and the network 11b without using connection to the network 11a via the network jack 200a. As in FIG. 4, the power 25 is supplied via the tip and ring conductors of the network 11b. The adapter 30 also has a transformation module 251 and a digital engine 250 (e.g. CG3111) and a standard modem 252 (e.g. HomePNA 3.1), such that the digital engine 250 facilitates communication of the data 26 with the communications device 28 over the Ethernet format device port 202, using Ethernet PHY and magnetics 254 communication format, while a modem 252 facilitates communication of the data 27a with the network 11b via the network port 200b. The Ethernet PHY and magnetics 254, for example, can be a 10BASE-T/100BASE-TX/100BASE-FX Physical Layer Transceiver and can provide MII/RMII/SMII interfaces to transmit and receive data 26 to/from the communications device 28. The MII interface can be used to connect to the CG3111 when in a "MAC mode". The modem 250 can include a Bit-Pump (e.g. HomePNA 3.1), an interchangeable host interface and a complete protocol stack firmware (e.g. HomePNA 3.1), for example, and can be configured to be either in the "MAC mode" or "PHY mode". The host interface can be configured by controlling MODE [3:0] pins, such that selecting '1' or '0' on the MODE[3:0] pins can be done by strapping an external 4.7 Kohm pull-up or down resistor, for example for a CopperGate (CG) chip set.

Referring again to FIG. 5a, the modem 252 (e.g. CG3112 HomePNA AFE) is an analog front end for broadband data communications and therefore interfaces with the data 27a communications over the network 11b. Accordingly, the CG3111/CG3112 combination supports operation over phone line, coax line and mixed phone/coax networks for communication of the data 26 (to/from the communications device 28) and corresponding data 27a (to/from the network 11b).

Figure 5C:
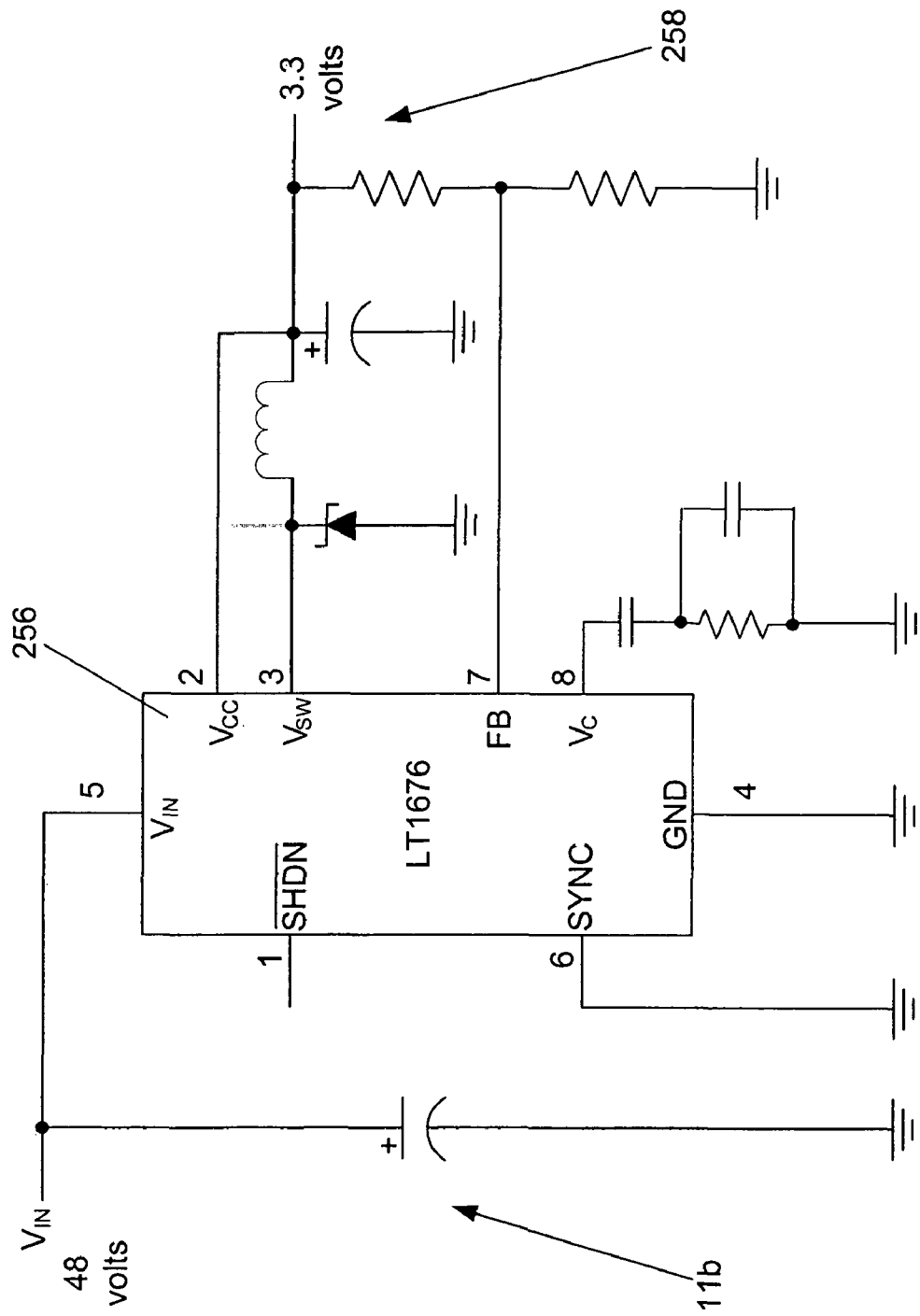

Referring to FIGS. 5a and 5c, one or more power regulators 256 (e.g. LT1676 is a wide Input Range, High Efficiency, Step-Down Switching Regulator), can be used for supplying operating power (e.g. different/multiple voltages 1.2v, 1.5v, 3.3v) for onboard components (e.g. modules 204, 210, 212, 213, 251) of the adapter 30. The regulator 256 can be used to step down the voltage from the incoming 48 volts of the network 11b to the level 258 used to power (e.g. 3.3 volts) the modems 250, 252 and the Ethernet PHY 254. The adapter 30 can also have an EEPROM, or other memory, for use in configuring the HPNA modem 250 (and modem 252 if desired). The adapter 30 can also have a header 260 for use as an expansion ports, e.g. in connection with a wireless card, not shown.

In view of the above, it is recognised that the HPNA protocol over the 2-wire telephone network 11b can be done for the data 27a or that xDSL protocol (or similar protocols)

could also be used, as desired. Further, it is recognised that the power 25 supplied by the adapter 30 of FIG. 4 can use the discovery module 212 as described with respect to FIG. 5a.

Discovery Module 212

Figure 6:
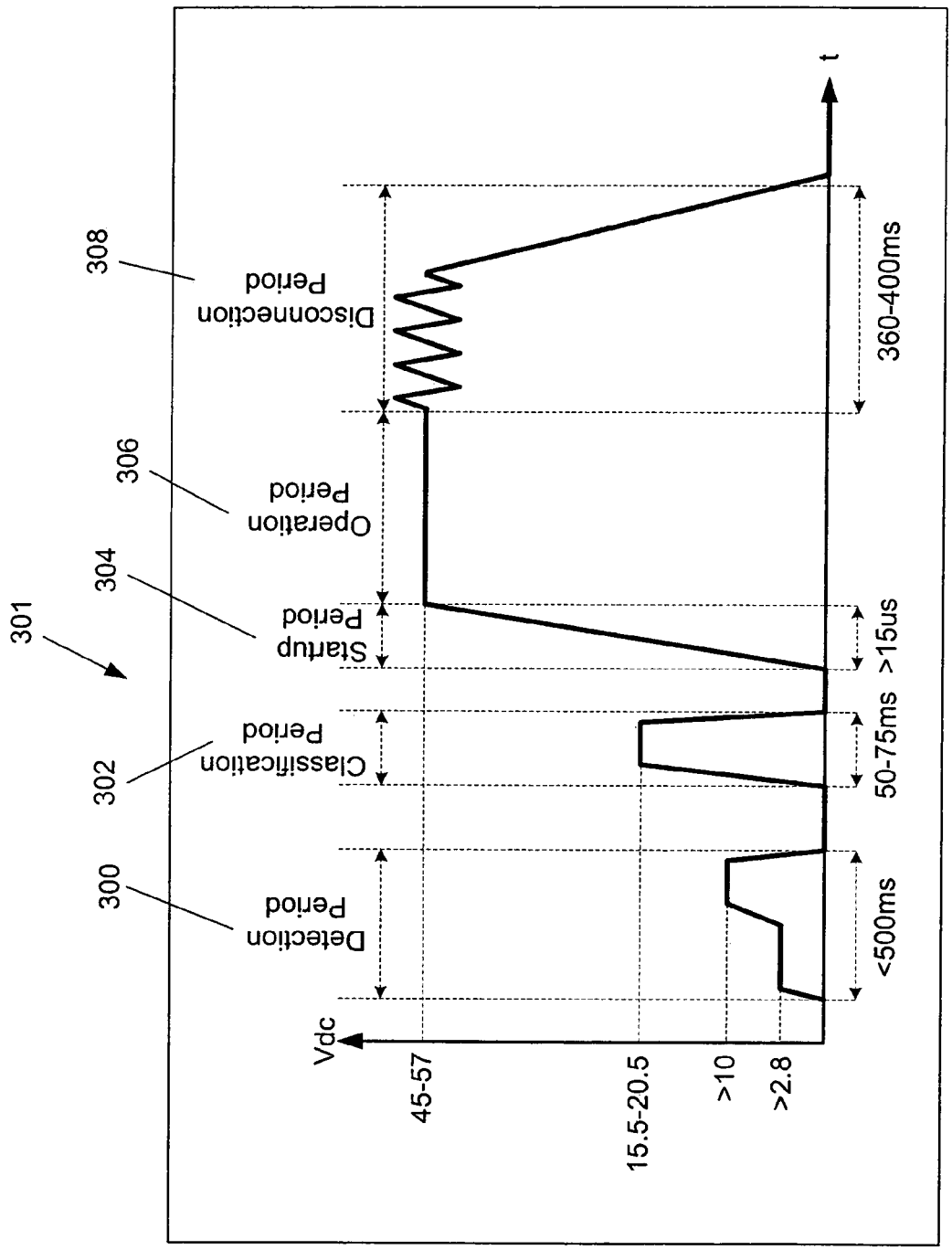

Referring to FIG. 6, shown is an example logic of a discovery module 212 (see FIG. 4) to perform a discovery algorithm, such that the PSE can be located in the proximity (e.g. (endspan or midspan—sufficient for power 25 transmission requirements via the conductors 64) of the communication device 28 and is connected to the communications device 28 via the conductors 64 (see FIGS. 2, 3). Further, the PSE can also be located at the unit 40 at one end of the network 11b remote from the adapter 30. As is shown by example, an inline (e.g. POE) power 25 process timing 301 (from the view point of the PSE) includes the sequence of the voltage being ramped up in steps, namely a detection period 300, a classification period 302, and a start-up period 304. Once the steps are completed, the full power 25 applied 306 to the communications device 28 only on successful completion of the discovery process 301. At 308, shown is an example of the voltage character upon disconnection of the communications device 28 from the adapter 30, thus disconnecting the adapter 30 from the networks 11a, b.

The power 25 initialization/discovery process 301 can include a series of power checks to determine whether the communications device 28 is configured to receive POE. The first check can include providing a small voltage level induced on the device port 202 (see FIG. 9a, b) until a valid end device (e.g. communications device 28) is detected. After a time controlled start-up, the jack 300b of the network 11b (to which the PSE is connected—see FIG. 5a) begins supplying the maximum/configured power level (e.g. 48 VDC) to the device port 202 for consumption by the detected communications device 28 until the communications device 28 is physically or electrically disconnected (at which point the voltage/power is shut down). Referring again to FIG. 6, one embodiment of the power check process 301 for powering up a POE link is as follows: stage 1—detection 300 by measuring whether the connected communications device 28 has a correct signature resistance (e.g. 15-33 kΩ) using a test voltage (e.g. 2.8-10.0 volts); stage 2—classification 302 by measuring which power level class the resistor indicates by using a classification voltage (e.g. 12.5-25.0 volts); and stage 3—start-up 304 and then normal operation 306 by supplying inline power 25 according to the power requirements of the detected communications device 28 (e.g. supplying 45.0-60.0 volts) via the device port 202.

For example, one embodiment of the discovery module 212 is a LTC4263 (see FIGS. 5a, b) that provides for detection and powering of the communication devices 28 in an IEEE 802.3af compliant (or other standard) system. The module 212 can control a PSE port 206 (e.g. part of the device port 202) that can detect, classify, and provide isolated 48V power to the communication devices 28 connected to the port 206. The LTC4263 can determine or "discover" if the connected device (to the port 206) is a communication device 28 by checking for the "characteristic" resistance of the phone, can sense removal of the communication device 28 with IEEE 802.3af compliant AC or DC methods (for example), and can turn off the power 25 when the communication device 28 is disconnected from the port 206. Further, the LTC4263 can control the operation of an indicator (e.g. LED pin—not shown), which can indicate the state of the port 206 controlled. Under port 206 fault conditions, the LED could flash in patterns to indicate the nature of the port fault. For example, in the adapter 30, the output of the port 200b connector can be connected to the LTC4263 and output of this can be connected across appropriate connector pairs (e.g. the spare pair or port 206) of the port 202.

Figure 12:
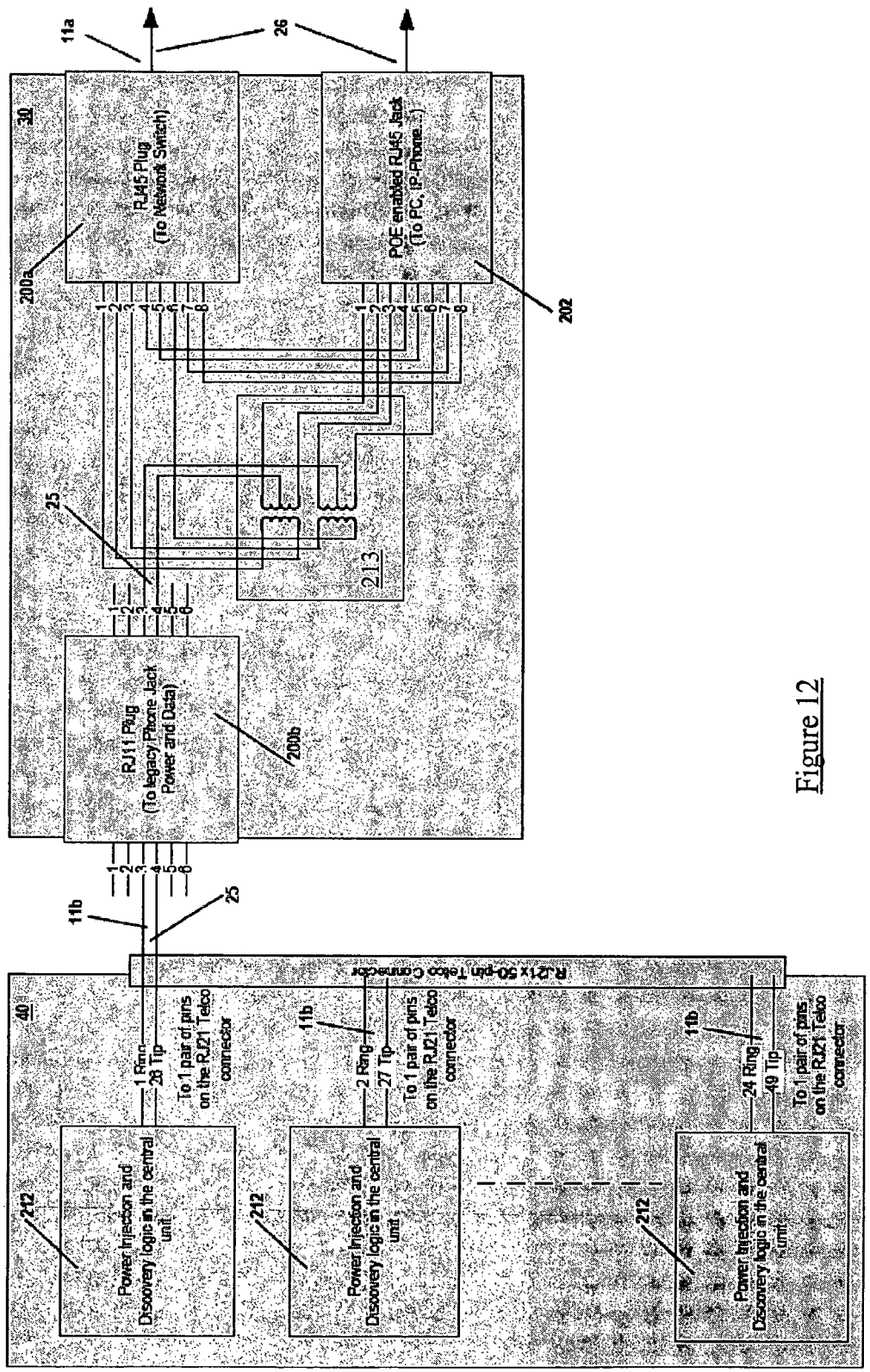
FIG. 12 is a further example configuration of the adapter and control unit of FIG. 1.
Figure 13:
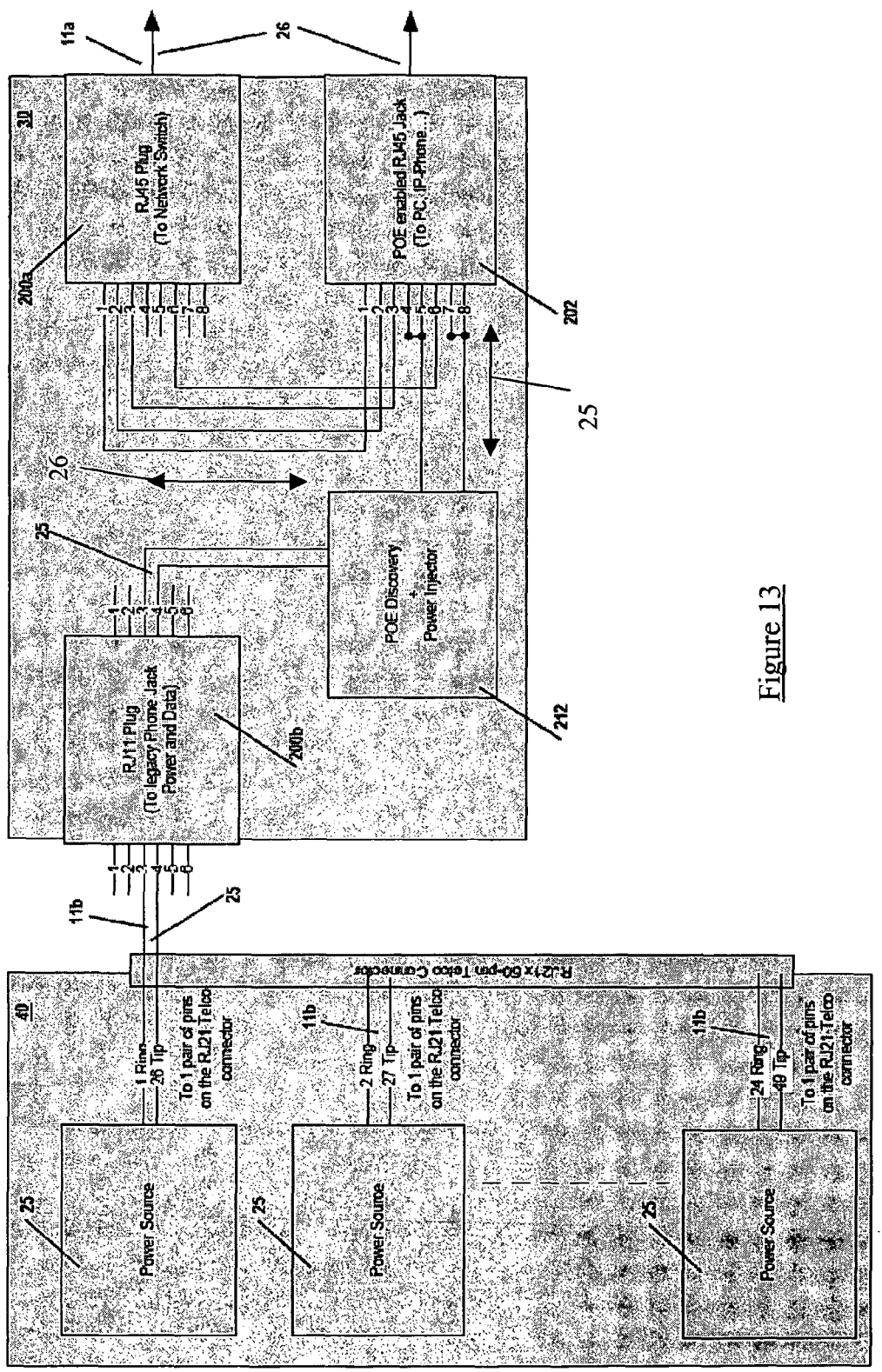
FIG. 13 is a further example configuration of the adapter and control unit of FIG. 1.

In view of the above, it is recognised that the discovery module 212 can be located in the adapter 30 and/or in the control unit 40, as desired. Referring to FIG. 12, an example of the discovery modules 212 is shown, located in the control unit 40. For example, each of the tip and ring connectors of the network 11b can have an independent discovery module 212, as desired, with a power coupling module 213 (e.g. passive coupling) that can be transformer and/or solid-state based coupling, located in the adapter 30 (for example), for coupling the power 25 to the port 202 from either the port 200a or the port 200b. Another example is as a single POE discovery logic 212 in unit 40 capable of stepping through the network jacks 300b connected to the adapters 30—one port at a time. Referring to FIG. 13, shown is an example configuration where the central unit 40 only sources the power 25, while the discovery logic is implemented in the adapter via the discovery modules 212. In this case, the power 25 is sourced from the network 11b while the data 26 is communicated over the network 11a.

Control Unit 40

Referring again to FIG. 7a, in terms of the conversion unit 40, the local environment 20 communicates the call data 26 from the communication device 28 via the adapter 30 to the network server 22 (e.g. network 11a gateway). The environment 20 can also provide for communication of the data 26 as the data 27a to the unit 40 via the adapter 30. In particular, the data 27a can be collected over two-wire pairs connected to a punch block 42 that is in turn connected to an RJ 21 interface of the unit 40. The conversion unit 40 in turn can transform the communication format from the communication format of communications data 27a to a packet-based data 26 communications format recognised by the network 11a (and vice versa), such as but not limited to an Ethernet compatible format. The unit 40 is connected to the network server 22 via a network 1 a compatible connection (e.g. RJ45 also referred to as 8P8C for eight positions eight conductors defining a modular connector with eight positions, all containing conductors).

that's ok, the network jacks do not need to be in those figures. The punch block 42 (also called punchblock, punchdown block, quick-connect block and other variations) is a type of electrical connection often used in telephony. The punch block 42 uses solid copper wires (of the conductors 64—see FIGS. 2, 3, 4) that are punched down into short open-ended slots known as Insulation-displacement connectors. These slots, usually cut crosswise (not lengthwise) across an insulating plastic bar, contain two sharp metal blades, which cut through the wire's insulation as it is punched down. These blades hold the wire in position and make the electrical contact with the wire as well. The RJ21 is an example of a registered jack standard for a modular connector using 50 conductors, usually used to implement a 25-line (or less) telephone connection for the network 11b via the punch block 42.

Further, it is recognised that adapter 30 can work with the unit 40, which is capable of handling wire protocols (e.g. two wire) and facilitates data/power bridging between the bank of wire pair inputs of the data/power format (e.g. from the RJ 21 interface) to Ethernet (e.g. via the RJ 45 interface). The unit 40 can supply power 25 (e.g. that supports POE—Power over Ethernet) to the adapter 30 over the same pair of wires (e.g. conductors 64) that carries the data 27a (optional) in the event that power 25 loss occurs or is otherwise not available from the network 11a connectors.

Accordingly, the unit 40 can receive the data 26 from the communications device 28 as the transformed data 27*a*, when routed/switched through the adapter 30 over the network 11*b*. The unit 40 transforms the received data 27*a* back into the data 26 format suitable for communication over the network 11*a*. The unit 40 can store in a routing table that the particular communications device 28 (with corresponding network 11*a* address) is now configured for communicating the data 27*a* over the network 11*b* rather than over the network 11*a*. This can be used to indicate a state of connection, whereas a routing can be used to route traffic to a specific endpoint that is the communication device 28. For example, the routing table could be a list of device IDs assigned to a corresponding network jack 300*b*. The table is used by the unit 40 to map any incoming data 26 from the network 11*a* to a particular communications device 28 on a particular port 300*b* of the network 11*b*. The unit 40 also becomes the call endpoint for any incoming data 26 (e.g. external to the environments 20) destined for the communications device 28. This endpoint can be defined/inserted in the header of the data 26 during the conversion by the unit 40 of the data 27*a* to the data 26.

Upon receipt of any data 26 from the network 11*a* (e.g. from a networked device on the network 11*a* external to the environment 20), the unit 40 notes with respect to the table which particular communications device 28 the data 26 is destined for (e.g. notes the network 11*a* address of the communications device 28), converts the data 26 into the data 27*a* format, and then communicates the data 27*a* to the appropriate jack 300*b* (assigned to the particular communications device 28) over the network 11*b* to the port 200*b* to which the particular communications device 28 is coupled (via the adapter 30). The adapter 30 receives the data 27*a* from the unit 40 and then converts the data 27*a* into the data 26 format for subsequent transmission via the device port 202 to the communications device 28. Accordingly, the cooperation of the unit 40 and the adapter 30 provide for data 26 as input/output with respect to the unit 40 and the network 11*a* and data 26 as input/output with respect to the adapter 30 and the communication device 28. Only between the adapter 30 and the unit 40 is the data 26 communicated as transformed data 27*a*. In view of the above, it is recognised that the unit 40 can be used as power sourcing equipment only, and as such is then not used for the communication of the data 27*a*, which is instead communicated directly as the data 26 over the network 11*a* from the communications device 28. It is also noted that the unit 40 can operate with respect to data 27*a* communications as the master to the adapter 30 being a slave of the unit 40. Further, it can be up to the internal configuration of the adapter 30 (e.g. which ports 200*a, b* are coupled to the port 202) as to which network 11*a, b* is used to receive and transmit the data 26, 27*a*. for example, the data 26, 27*a* could be sent/broadcast to the communications device 28 over both of the networks 11*a, b* simultaneously and it would be up to the port 200*a, b*, 202 configuration of the adapter 30 as to which received (by the adapter 30) network communication gets then forwarded to the communications device 28.

Figure 11:
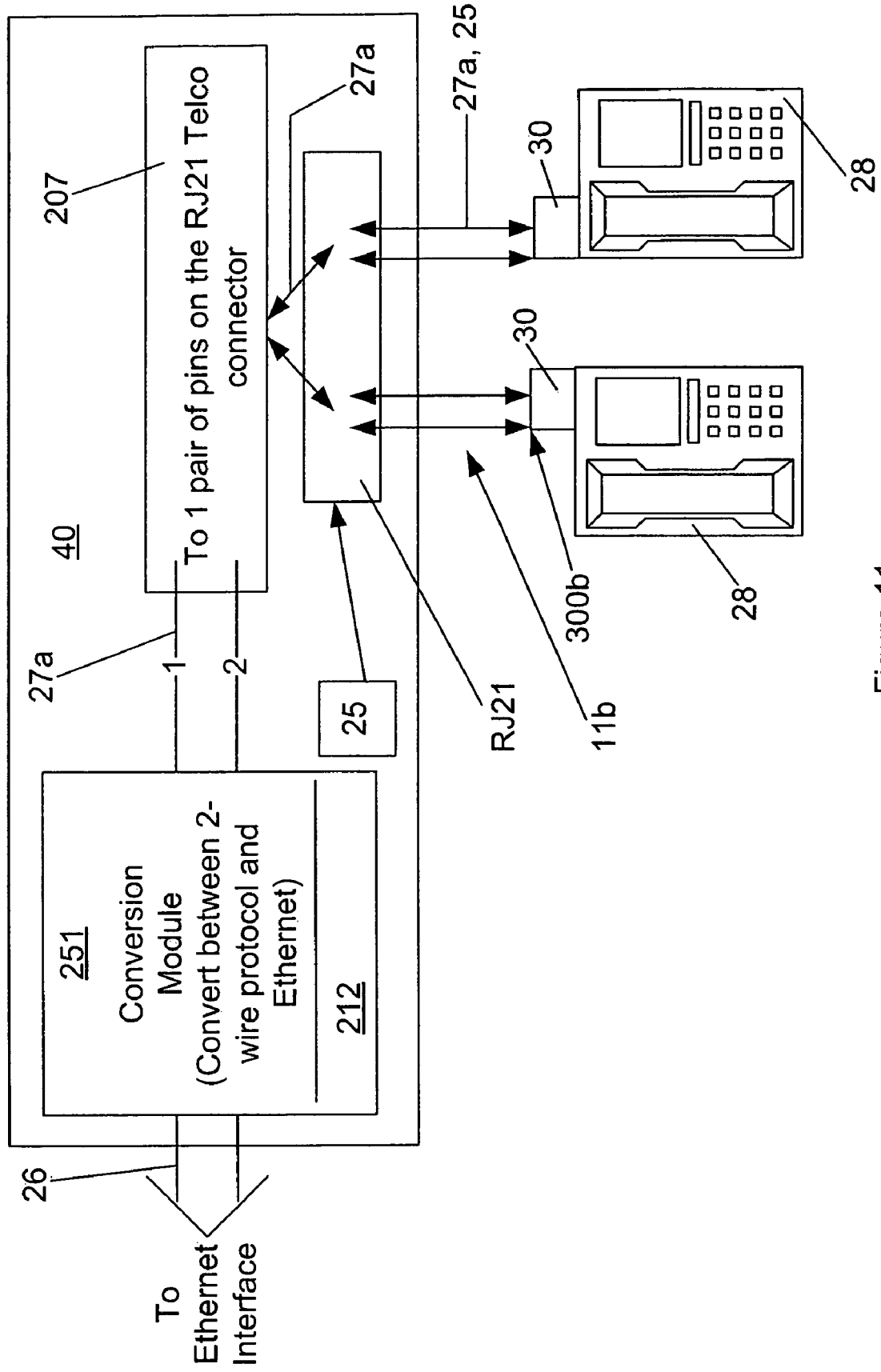
FIG. 11 is a further embodiment of the control unit of FIG. 7*a*.

Referring to FIG. 11, shown is an embodiment of the transformation module 251 in the unit 40 corresponding to the transformation module 251 in the adapter 30 (see FIGS. 9*a, b*), connected to the pair of telephone wires (one of the wire pairs of the network 11*b*) coming from the adapter 30 that is coupled via the network jack 300*b* to the communications device 28. The wire pair 1, 2 of the unit 40 interface (e.g. RJ 21 connector) is connected to wire pair 3, 4 (e.g. tip and ring connectors) of the RJ11 plug (network jack 300*b*) to which the communications device 28 is coupled. As well, a routing module 207 of the unit 40 can be used to select which of the wire pairs from the unit interface (e.g. RJ 21) are to be used to communicate the power 25 (in the case of the discovery module 212 shared over two or more of the wire pairs of the network 11*b*)/data 27*a* over the network 11*b* to the particular/selected communications device 28 that the power 25/data 27*a* is intended for. It is recognised that the conversion module 251 and the routing module 207 functionality can be combined, as desired.

Unit 40 Example

Figure 7A:
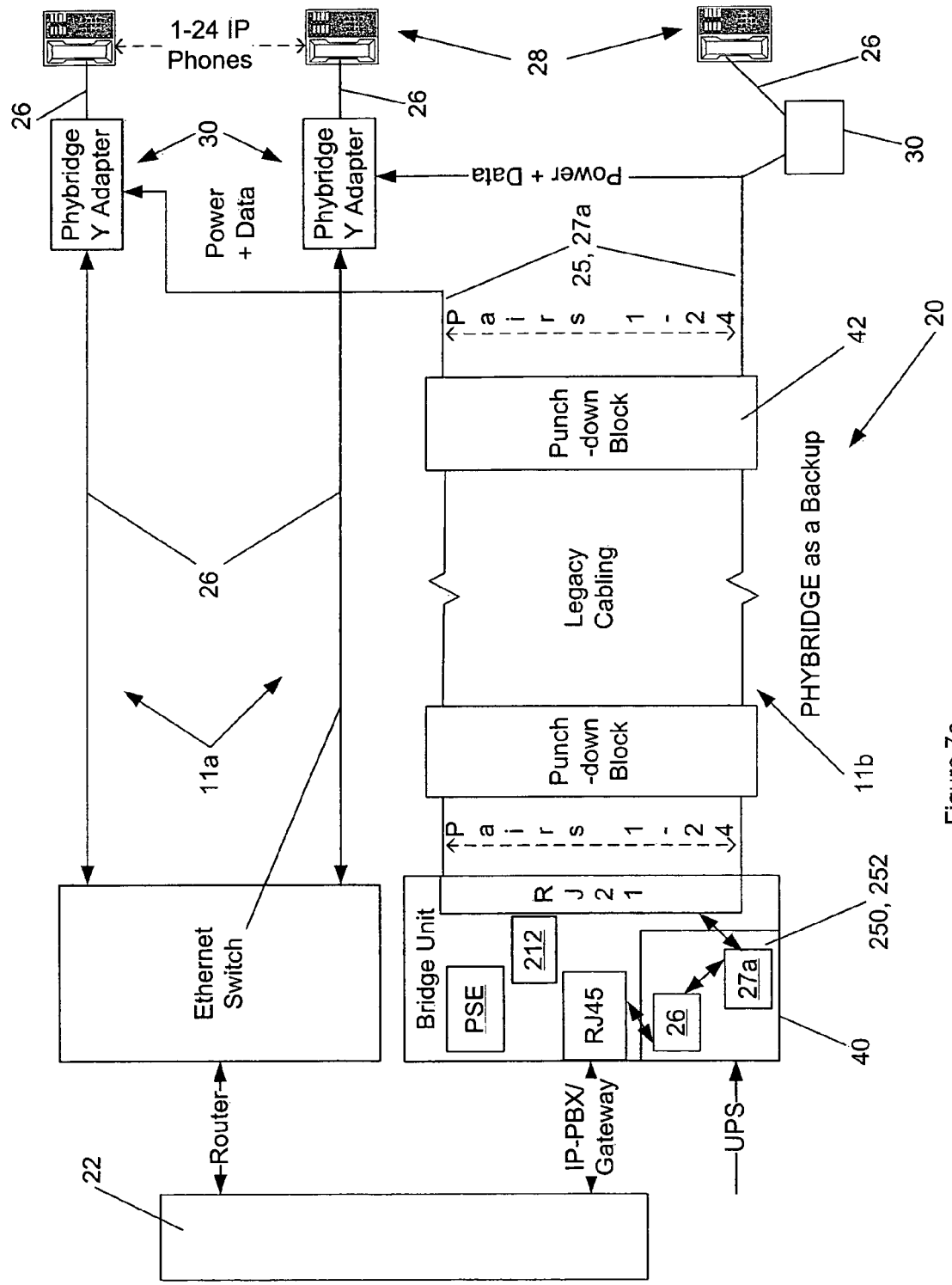
FIG. 7a shows a block diagram of the control unit of FIG. 1.
Figure 7B:
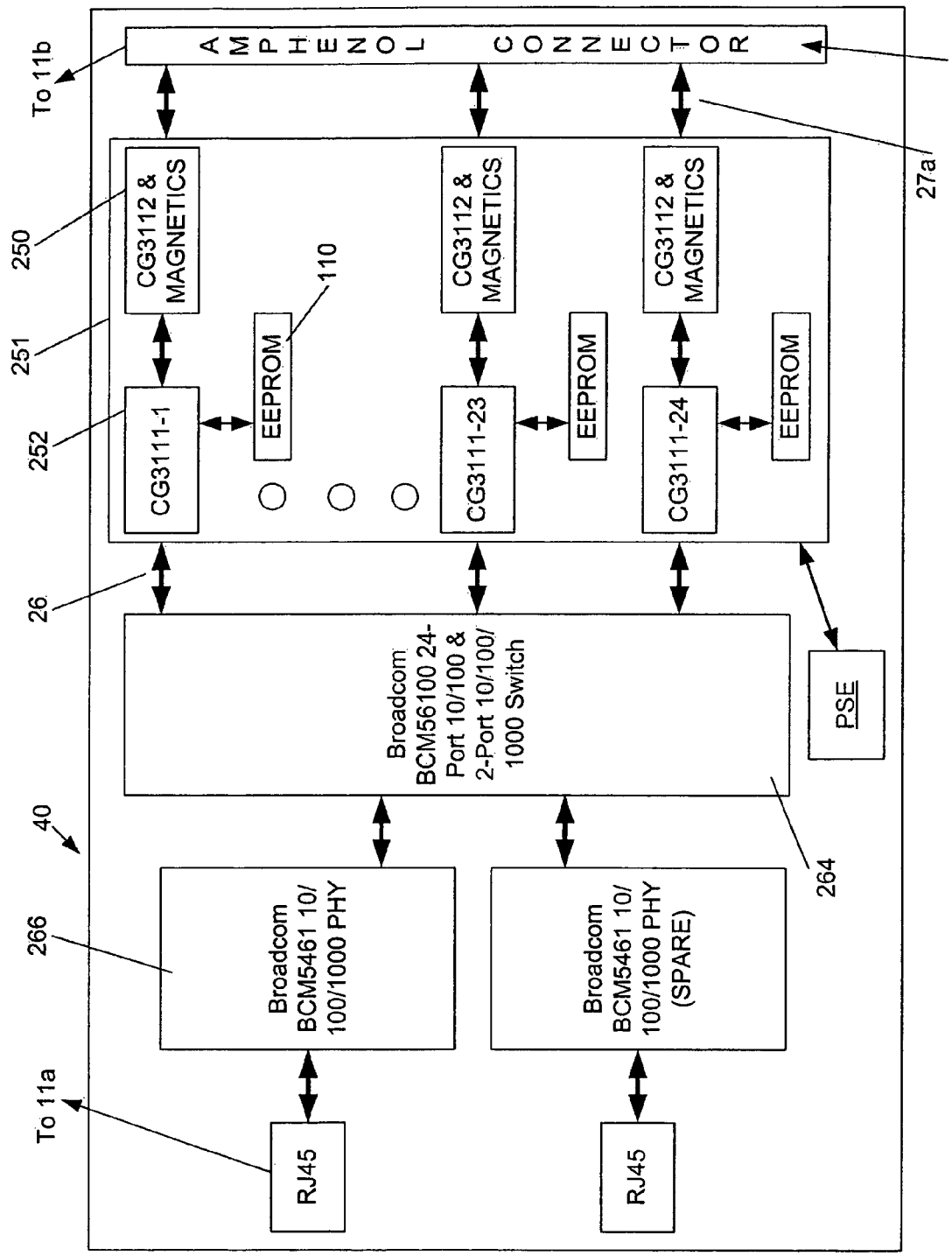

Referring to FIG. 7*b*, on the unit 40 side, a total of 24 CG3111s can be used in the "PHY mode", for example, in order to connect via a connector 62 (e.g. RJ21) with the network jacks 300*b* of the network 11*b*. As discussed above with respect to FIG. 5*a*, the modems 250, 252 and associated electronics are used to perform the conversion between the communication protocols used for the data 26 and 27*a*. An Ethernet switch 264 (e.g. a 24 port fast Ethernet and 2 port gigabit Ethernet multilayer switch) is used to connect the unit 40 to the network 11*a*. One example of the Ethernet switch 264 is a BCM56100, which has a 24-10/100 Mbps Ethernet port and two 10/100/1000 Mbps Ethernet ports, line-rate switching for all packet sizes and conditions, on-chip data packet memory and table memory, IPv6 routing and tunnelling, and data 26 packet flow control. The unit 40 also has a transceiver 266 for communicating the data 26 with respect to the network 11*a*. For example, the transceiver 266 can be a fully integrated 10/100/1000 BASE-T Gigabit transceiver, supporting multiple MAC interfaces, e.g. GMII, RGMII, and MII.

Communications Network 11*a*

Referring again to FIG. 1, it is recognised that the geographic/physical coordinates of the communication devices 28 that are wired (rather than wirelessly connected) to the network 11*a* can change, depending upon the user's location. The geographic location of a particular communication device 28 can change from one communication environment 20 to the next, e.g. from a user's home to the user's office building, as well as can change to different locations within a particular communication environment 20, e.g. from one office room/floor to the next. Each of the communication devices 28 is assigned the device identity that is carried with the communication device 28 (e.g. a MAC address), which is subsequently associated with the user of the communication device 28. All calls (e.g. voice/video data 26) made from the communication device 28 are associated with the assigned device identity of the communication device 28, including the virtual telephone number/line dynamically assigned to the communications device 28 coupled to the communications network 11*a* via the network jack 300*a*.

The communication devices 28 can be distributed in a plurality of communication environments 20 that are connected to the network 11*a* through the network jacks 300*a* via a network server 22. The network server 22 is used as a communications interface between the communication environments 20 and the network 11*a*. It is recognised that the environments 20 could be located on a network LAN (e.g. Ethernet 11*a* and legacy telephone wires 11*b*) and the external network 11*a* could be a WAN, e.g. the Internet, such that the network server 22 provides the communications gateway between the LAN and WAN. For example, the network server 22 can provide for data 26 communications between the communication devices 28 and the communication proxy system 21 (e.g. Local Exchange Carrier—LEC—and/or the SIP proxy server 23).

The communication devices 28 and their associated network jacks 300*a* can be differentiated from traditional telephones 31 and their associated network jacks 300*b* in that the communication devices 28 are dynamically assigned their network 11a address (e.g. a virtual telephone number/line, SIP/IP address) independently of the jack 300a. For example, a SIP address is dynamically assigned to a recognised communications device 28 (via the device's ID). Once assigned, the network 11a recognises the network jack 300a as the network 11a connection point for communicating packet-based call data 26 to and from the communications device 28. The SIP (Session Initiation Protocol) can be used to supply one address to the user, which can be used for text, video, and/or voice communications. SIP addresses have the same format as email addresses and can be used via the SIP server 23 as an email address and mobile phone, work phone, and home phone numbers. The call data 26 can include the device identity that is associated with communications device 28, as further described below.

For the communications devices 28 (e.g. an IP phone), there is no direct relationship between the physical wiring of the network jack 300a (see FIG. 4) and the number of IP telephone lines/numbers that the communications device 28 and the corresponding network jack 300a can support. For example, communications devices 28 operating on 100-Mbps Ethernet connections can theoretically support hundreds of phone lines/numbers. The number of telephone numbers/lines that the communication device 28 (through the network jack 300a) supports can be determined by the design of the communication device 28 user interface 102 (see FIG. 2), not the physical connectivity to the network 11a. The user interface 102 might be a traditional looking one that has a physical button for each line the communications device 28 supports. In particular, the communications network address is dynamically assigned to the communications device 28 via the network jack 300a, as further described below, as compared to the static or dedicated assignment of the telephone line/number to the telephone 31 via the network jack 300b. Accordingly, the jack 300a is configured so as to facilitate multi-line and/or network 11a applications.

One example of the communications network 11a is the Internet for the network 11a outside of the environments 20, which is a worldwide, publicly accessible network of interconnected computer networks that transmit data (e.g. call data 26) by packet switching using the standard Internet Protocol (IP). The communications network protocol(s), in the case of the Internet protocols, can have three layers of protocols, namely: at the lower level (OSI layer 3) is IP (Internet Protocol—Ipv4, Ipv6), which defines the datagrams or packets that carry blocks of data (e.g. call data 26) from one node to another. ICMP (Internet Control Message Protocol) also exists at this level. ICMP is connectionless; it is used for control, signalling, and error reporting purposes; the TCP (Transmission Control Protocol) and UDP (User Datagram Protocol) exist at the next layer up (OSI layer 4), which are the protocols by which data 26 is transmitted; and the application protocols, sit on top of TCP and UDP and occupy layers 5, 6, and 7 of the OSI model, which defines the specific messages and data formats sent and understood by the applications running at each end of the communication over the network 11a (examples of these protocols are HTTP, FTP, and SMTP). There is another protocol (in layer 2 of the OSI model) below IP, namely PPP, and on LANs this protocol is nearly always Ethernet.

Ethernet is another example of the communications network 11a, and defines a number of wiring and signalling standards for the physical layer, through means of network access at the Media Access Control (MAC)/Data Link Layer and a common addressing format, used as the communications network protocol(s) of the Ethernet. Ethernet has been standardized as IEEE 802.3. The combination of the twisted pair versions of Ethernet for connecting end systems to the network 11a.

Above the physical layer, Ethernet stations of the network 11a communicate by sending each other data packets, small blocks of data that are individually sent and delivered. As with other IEEE 802 LANs, each Ethernet station can be given a single 48-bit MAC address, which is used both to specify the destination and the source of each data packet. Network interface cards (NICs) or chips normally do not accept packets addressed to other Ethernet stations. Currently Ethernet has many varieties that vary both in speed and physical medium used. Perhaps the most common forms used are 10BASE-T, 100BASE-TX, and 1000BASE-T. All three utilize twisted pair cables and 8P8C modular connectors via network jacks 300a (often referred to as RJ45). These jacks 300a and associated connectors/cables run at 10 Mbit/s, 100 Mbit/s, and 1 Gbit/s, respectively. Since packets are typically only delivered to the port they are intended for, traffic on a switched Ethernet (e.g. network 11a) can be slightly less public than on shared-medium Ethernet.

Referring again to FIG. 1, the administration server 24 (or other mechanism such as an IP-PBX) facilitates the dynamic assignment/registration of the network 11a address (e.g. IP address, SIP address) to a particular communications device 28 located in the corresponding communications environment 20, as recognised by the network server 22. One example of this is where an IT person sets up an IP phone in an office of a company user, such that the administration server 24 assigns a selected IP address to the particular communications device 28 connected to the network 11a via the network jack 300a. Once registered, the particular communications device 28 is enabled to communicate via IP telephony over the network 11a with a communication proxy system 21. It is recognised that the above IP addresses can also include transient IP addresses (leased) for routing using IP addresses.

One embodiment of the initialization process for the communications device 28, i.e. dynamic assignment of the network 11a address, is registration (e.g. DHCP, BOOTP, etc.) of the communications device 28 attempted with the network administrator server 24 (see FIG. 1). The registration process assigns an IP address to the communications device 28 from a pool of addresses for certain durations of time. DHCP, short for Dynamic Host Configuration Protocol, is a protocol for assigning dynamic network 11a IP addresses to the communication devices 28. The dynamic addressing facilitates the communications device 28 to have a different/selected IP address every time the communication device connects to the network 11a via the network jack 300a. It is recognised that the communication device's 28 IP address can change while the communication device 28 remains connected to the network 11a. DHCP lets the network administrator server 24 centrally manage and automate network 11a connection requests and their subsequent assignment of Internet Protocol (IP) addresses to the communication devices 28 connected to an organization's network 11a (e.g. intranet or LAN). Using the Internet Protocol, each communication device 28 connects to the Internet using a unique IP address, which is assigned by the administration server 24 when the Internet connection is created for a specific communication device 28. DHCP automatically assigns a new IP address when the communication device 28 is plugged into an entry point (e.g. network jack 300a) of the network 11a, using the concept of a "lease" or amount of time that the assigned IP address will be valid for a selected communication device 28. Another network IP management protocol is the Bootstrap Protocol (BOOTP). A DHCP or BOOTP client can be a program that is located in (and perhaps downloaded to) each communications device 28 and stored in the memory 110 (see FIG. 8) so that the communications device 28 can be configured for network 11*a* communications. For example, many ISPs use dynamic IP addressing for dial-up users.

Another embodiment of the registration process for the communication devices 28 is when the user logs on to the communications device 28 already connected to the network 11*a*. In this case, the communications device 28 can then register (e.g. sends a SIP message (an invite) over the network 11*a* to a SIP register which is maintained by the user's VoIP service provider) with the SIP proxy server 23 to facilitate dialling calls by methods other than using IP address. The SIP proxy server 23 can also provide hold and transfer services. In this case, the administration server 24 points to a DNS server (e.g. SIP server 23) on the network 11*a* and the administration server 24 will use the SIP proxy server 23 to register the communications device 28 with the SIP register. Once registered (e.g. the communications device 28 receives a SIP acknowledgement), two-way communication is enabled between the proxy server 23 and the communications device 28.

In view of the above, it is recognised that the administration server 24 may not need to monitor the telephone lines/numbers of the telephone jacks 300*b*, as these can contain dedicated telephone lines/numbers that are statically assigned to the jacks 300*b* during physical installation thereof (e.g. the assignment of selected wire pair of the jacks 300*b* to a dedicated phone number/line as registered with the LEC). Accordingly, any telephone 28, 31 connected to those jacks 300*b* can automatically assume the dedicated telephone lines/numbers of the respective jacks 300*b* that they are physically connected to (e.g. via telephone cords/cables). In the case of using the jacks 300*b* as an entry point to the network 11*b* for communication of the data 26 as backup/rerouted data 27*a*, the network jacks 300*b* can be configured through interaction with the bridge unit 40 as the end point destination for the data 26 received/intercepted by the unit 40 from the network 11*a* for transmission to the communications device 28 for eventual receipt as the data 26.

Telephone Network 11*b*

The telephone network 11*b* is connected to the public switched telephone network or PSTN and can be defined as providing plain old telephone service, or POTS, for communicating the telephone data 27*b* of the legacy telephones 31, as well as for communicating the call data 27*a* (e.g. digital services—xDSL) for the communication devices 28 to the outside world (e.g. external to the environments 20). It is recognised that the network 11*b* can be used for connecting the legacy telephones 31 via the network jacks 300*b* for use in communicating the telephone data 27*b* as well as for connecting the communication devices 28 (via the adapter 30) for use in communicating the call data 27*a* (e.g. xDSL). The telephone network 11*b* facilitates voice-grade telephone service (i.e. telephone data 27*b*) that is characterized by the dedicated/static telephone number that is assigned to a telephone network jack 300*b* (see FIG. 1). It is recognised that 300*b* can also used as an extension/extending network data, such that it does not have a dedicated phone number. It is recognised that the dedicated phone number of the network jack 300*b* may also be assigned internally in a company to a specific extension number that is associated with the dedicated telephone number. In this case, each of the network jacks 300*b* can have a dedicated telephone extension number that is a subset of the dedicated telephone number for the company. In any event, it is recognised that the network jack 300*b* can have a dedicated telephone number/extension assigned thereto, such that any telephone 31 that is connected to the network jack 300*b* then assumes the dedicated telephone number/extension assigned to the network jack 300*b*. Further, the telephone network 11*b* can use digital switch/circuit technologies between telephone exchanges (e.g. Local Exchange Carrier—LEC) with analog two-wire circuits used to connect to most telephones 31 via the telephone network jacks 300*b*. It is noted that in a legacy telephone system, power for the telephone is provided over the 2-wires along with signalling.

The network jack 300*b* can be an RJ11/RJ12 jack, for example, which is a physical interface often used for terminating telephone 31 wires. As well, an RJ14 jack is similar to an RJ11 jack, but for a dedicated two-line network jack 300*b*, and an RJ25 jack is for a dedicated three line network jack 300*b*. It is recognised that other RJ jack 300*b* configurations can be used. In particular, the RJ11 jack uses two of the six positions to connect tip and ring requirements of the telephone 31. The RJ11 jack is typically a 6P4C jack, with four wires running to a central junction box, two of them unused. The extra wires can be used for various things such as a ground for selective ringers, low voltage for a dial light, or as an 'anti-tinkle' circuit to prevent a pulse dialling phone from ringing the bell on other extensions. With tone dialling, the extra wires/connectors can be used to provide flexibility so the jack 300*b* can be rewired later as RJ14 or to supply additional power for special uses. Similarly, cables used to plug the telephone 31 (e.g. telephone terminals) into the RJ11 jacks frequently are four-wire cables with 6P4C plugs. The telephone line cables and its plug are more often a true RJ11 with only two conductors. Accordingly, it is recognised that in an analog PBX or Key System, the number of twisted-pair cables connected to the telephone jack 300*b* determines how many telephone lines/numbers the telephone has access to. If more phone numbers/lines, are desired, one has to add more wires. This is still mostly true for digital TDM phones. An example is a Basic Rate Interface (BRI) phone with a twisted-pair cable carrying 2B+D—that is, two bearer channels (audio) plus one data channel (signalling).

Further, it is recognised that data devices 28, such as computers, modems and facsimile machines, can also be designed to use the data 27*a* communication service of the telephone network 11*b* to transmit digital information. Further, while the telephone network 11*b* provides limited communication features, low bandwidth and no mobile capabilities, it can provide greater reliability (e.g. dial-tone availability) than other telephony systems (mobile phone, VoIP, etc.). Services of the telephone network 11*b* via the PSTN provided via the telephone network communication protocol(s) to the telephones 31 include: bi-directional, or full duplex, voice path with limited frequency range of 300 to 3400 Hz as a signal to carry the sound of the human voice both ways at once; call-progress tones, such as dial tone and ringing signal; subscriber dialing; operator services, such as directory assistance, long distance, and conference calling assistance; and a standards compliant analog telephone interface including BORSCHT functions. BORSCHT is an acronym for: Battery feed; Overvoltage protection; Ringing; Supervision; Codec; Hybrid; and Testing. The electronic functions, collectively known as BORSCHT, are used in POTS telephony signalling, line supervision and telephone terminal operation.-BORSCHT circuitry can be located on a telecommunications network-line card and can be integrated into a chipset for implementation of a standard POTS telephone interface in desktop computers.

Accordingly, it is recognised that the communication device 28 could be connected to the network 11*b* also via the adapter having the network 11b interface comprising a standard POTS telephone interface, such that communication of the call data is done via dial-up communication protocols and the adapter 30 converts the communication protocols between the packet-based data 26 of the communications device 28 and the dial-up communication protocol of the call data 27b.

The PSTN is the network of the world's public circuit-switched telephone networks, in much the same way that the Internet is the network of the world's public IP-based packet-switched networks. In terms of signalling protocols in the telephone network 11b, a pair of wires (facilitating the dedicated telephone number) from the central switch office to a subscriber's home is powered by 40V direct current (DC) and backed up by a bank of batteries (connected in series) in the central office, resulting in potential continuation of service during commercial power outages. The pair of wires can carry a "load" of about 300 Ohms of the telephone 31.

Telephone network communication protocol(s) of the telephone network 11b can include technical standards created by the ITU-T, for example, and use E.163/E.164 addresses (known more commonly as telephone numbers) for supplying the dedicated addressing of the telephone jacks 300b. For example, to carry a typical phone call from a calling party to a called party, the audio sound is digitized at an 8 kHz sample rate using 8-bit pulse code modulation (PCM). The call is then transmitted from one end to another via the telephone exchanges (e.g. LECs). The call is switched using a signalling protocol (SS7) between the telephone exchanges under an overall routing strategy. For data communication other than voice, some variants of DSL modem connections, like ADSL and VDSL, typically work by dividing the frequencies used in a single phone line of the telephone network 11b into two primary 'bands'. The ISP data is carried over the high frequency band (25 Khz and above) whereas the voice is carried over the lower frequency band (4 Khz and below). DSL filters are used for each telephone 31, which is used to filter out high frequencies from the telephone 31, so that the telephone 31 only sends or receives the lower frequencies (the human voice), creating two independent 'bands'. Thus the DSL and the phone can simultaneously use the same dedicated phone line without interfering with one another.

In terms of data communication protocols, the network 11b can be used for both analogue 27b, as well as digital data 27a communications, as enabled through a translation module 251 (when needed) of the adapter 30 (see FIGS. 9a, b), as well as the corresponding translation capability of the translation module 251 of the conversion unit 40 (see FIGS. 7a, b). For example using an Analog Telephone Adapter (ATA) formatting scheme, the translation module 251 (and conversion unit 40) can convert analog signals 27b into another format (such as digital protocols for the data 27a). The ATA scheme translates analog calls into packets, and vice versa, thereby demodulating the analog signal and its values into a string of 0 and 1 values, i.e. digital information. The ATA scheme may provide a single function such as providing Internet telephone service or they may convert digital signals into several different forms such as audio, data, and video. ATA schemes can convert both the audio signals (voice) and control signals (such as touch tone or hold requests) into forms that can be sent and received via the packet-based network 11a. One type of ATA scheme is a Foreign Exchange Station (FXS) to USB Adapter, which connects via an RJ11 connector to a computer via the computer's USB port. Another type of ATA scheme directly performs the analog-to-digital voice conversion, and is configured to format the data 27 for communication using protocols such as xDSL, HPNA. Voice signals can be encoded and decoded using GSM, A-law, u-law and other such voice codecs.

In terms of communication devices 28, the network 11b can also handle direct digital communication of the data 27a using an xDSL format as done through the module 251 of the adapter 30 and modules 250, 252 of the conversion unit 40, when needed, which converts data from the digital signals used by the communications device 28 into a voltage signal of a suitable frequency range which is then applied to the network 11b. xDSL refers collectively to all types of digital subscriber lines, the two main categories being ADSL and SDSL. Two other types of xDSL technologies are High-data-rate DSL (HDSL) and Very high DSL (VDSL). DSL is known as Digital Subscriber Line. In general DSL formatting uses sophisticated modulation schemes to pack data 27a onto copper wires of the network 11b in a DSL digital format.

It is recognised that the network 11b can utilize circuit switched and/or packet-based communications traffic (e.g. riding on top of the DSL layer, packet-based transport is used to replacing traditional circuit-switched transport). In the packet-based model, communications traffic data 26, 27a is encapsulated into variable-length packets or fixed-length cells, which are switched or routed over the network 11a directly (as the data 26) or over the network 11a via the network 11b (as the data 27a), based on information in the packet or cell header of the data 26, 27a.

In any event, it is recognised that there can be differing data communication formats used for the data 27a on the network 11b and for the data 26 on the network 11a, such that the adapter 30 provides for format conversion between the network 11b and the communications device 28 (e.g. for data 26 to data 27a and vice versa) and the conversion unit 40 provides for the complimentary format conversion between the network 11a (e.g. external to the environment 20) and the network 11b (e.g. for data 26 to data 27a and vice versa).

Example Device 28 and/or Adapter 30, Unit 40 Configuration

Figure 8:
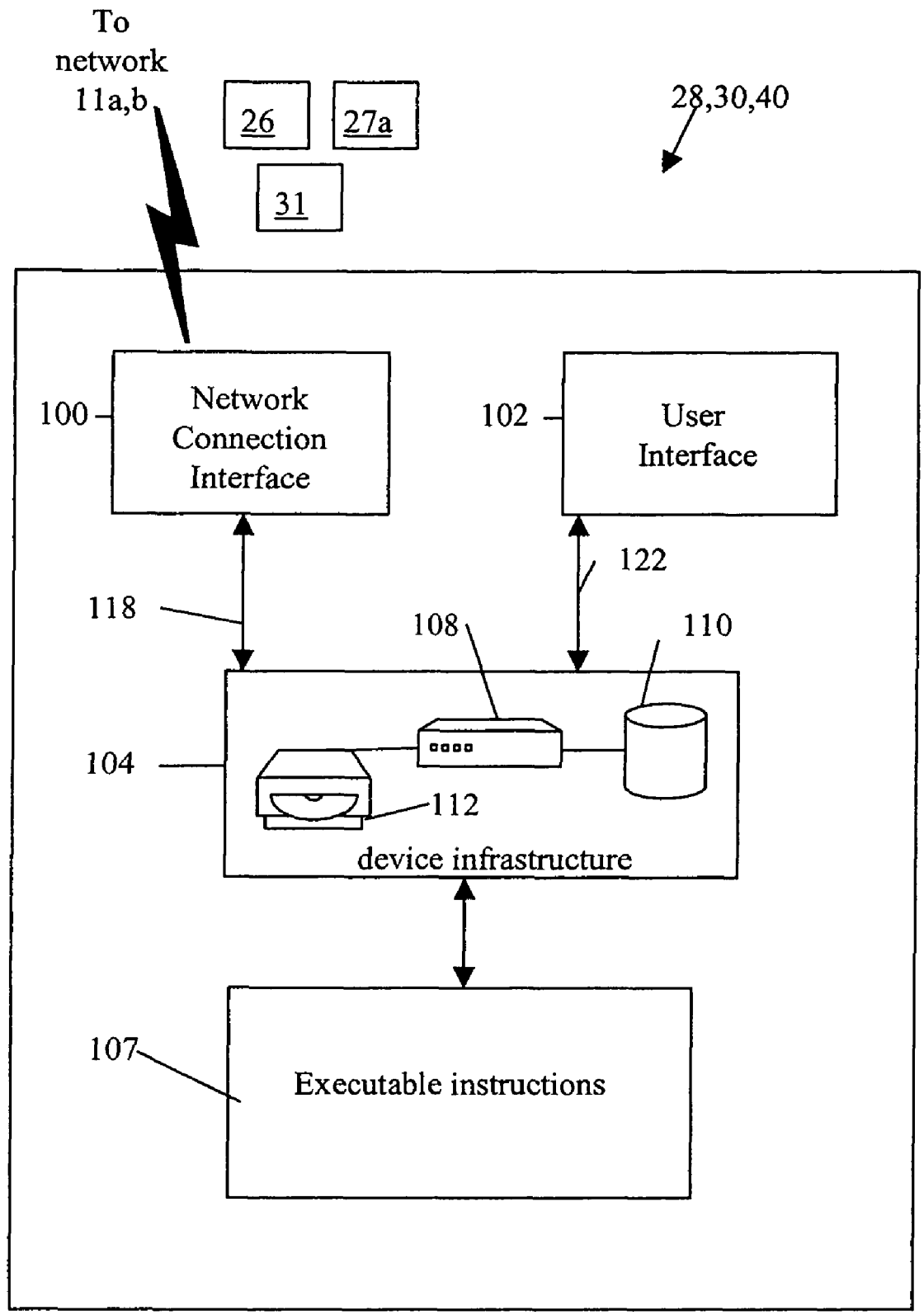
FIG. 8 is a block diagram of the configuration of the adapter, control unit and the communications device of FIG. 1.

Referring to FIG. 8, the device 28 and/or the adapter 30 and unit 40 can include a network interface 100 (e.g. transceiver/modem) coupled via connection 118 to an infrastructure 104. The network interface 100 (e.g. the ports 200a, b, 202 for the adapter 30—see FIGS. 9a, b) is connectable during operation of the device 28 and/or the adapter 30 to the network 11a, b by a suitable channel, e.g. wireless RF or IR links or Ethernet/Internet connection, which enables the device 28 and/or the adapter 30 to communicate with each other and with external systems (such as the network server 22 and the control unit 40 in the case of the adapter 30) via the network 11a, b. The network 11a, b supports the transmission of data 26, 27a (e.g. voice, voice and associated video, etc.) and associated initialization messages (e.g. DHCP, BOOTP, SIP messages) for the communications device 28.

Referring again to FIG. 8, the device 28 and/or the adapter 30 can also have a user interface 102, coupled to the infrastructure 104 by connection 122, to interact with a user (not shown). The user interface 102 can include one or more user input devices such as but not limited to a USB port, a QWERTY keyboard, a keypad, a track wheel, a stylus, and a user output device such as an LCD screen display. If the screen is touch sensitive, then the display can also be used as the user input device as controlled by the infrastructure 104. The user interface 102 can be employed by the user of the device 28 and/or the adapter 30 to facilitate voice communication over the network 11a, b (in the case of the device 28) and to facilitate programming of switch/translation/discovery logic (in the case of the adapter 30). For example, the communications device 28 might simply have a touch screen 102.

In this case, the number of square inches available on the display 102 may determine the maximum number of lines accessible to the user. Other variations on user interface 102 design might include the use of pull-down menus or scroll bars to select a phone line. Another example of the interface 102 is a PC softphone, which is an application program running on a desktop computer where the user can select a phone line from the display 102 with a mouse click.

Referring again to FIG. 8, operation of the device 28 and/or the adapter 30 can be enabled by the infrastructure 104. The infrastructure 104 can include a computer processor 108 and associated memory module 110. The computer processor 108 manipulates the operation of the device 28 and/or the adapter 30 configured for the intended task through operation of the network interface 100, the user interface 102 and other application programs/hardware 107 of the device 28, 30 by executing task related instructions. These task related instructions can be provided by an operating system, and/or software applications 107 located in the memory 110, and/or by operability that is configured into the electronic/digital circuitry of the processor(s) 108 designed to perform the specific task(s). Further, it is recognized that the infrastructure 104 can include a computer readable storage medium 112 coupled to the processor 108 for providing instructions to the processor 108 and/or to load/update the device 28 and/or the adapter 30 with configuration data in the memory module 110. The computer readable medium 112 can include hardware and/or software such as, by way of example only, magnetic disks, magnetic tape, optically readable medium such as CD/DVD ROMS, and memory cards. In each case, the computer readable medium 112 may take the form of a flash memory, small disk, floppy diskette, cassette, hard disk drive, solid-state memory card, or RAM provided in the memory module 110. It should be noted that the above listed example computer readable mediums 112 can be used either alone or in combination.

Further, it is recognized that the device 28 and/or the adapter 30 can include the executable applications 107 comprising code or machine-readable instructions for implementing predetermined functions/operations. The processor 108 as used herein is a configured device and/or set of machine-readable instructions for performing operations as described by example above. As used herein, the processor 108 may comprise any one or combination of, hardware, and/or a combination of hardware and software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example. Accordingly, any of the functionality of the adapter 30 (e.g. modules 200*a*, *b* (e.g. ports), 202, 204, 207, 251, 210, 212, and subset thereof) may be implemented in hardware/software. Accordingly, the use of a processor 108 as a device and/or as a set of machine-readable instructions is hereafter referred to generically as a processor/module for sake of simplicity. Further, it is recognised that any functionality of the modules 200*a*, *b*, 202, 204, 207, 251, 208, 210, 212 can be combined as shown, further subdivided into additional modules, or combined into fewer modules, as desired.

Communications Device 28

Referring to FIG. 1, the communications devices 28 (e.g. VoIP phone such as hardware or software enabled) are used to receive incoming phone calls and to place outgoing phone calls, which are automatically routed with respect to the communications device 28 using the assigned network 11*a* address, regardless of where the communications device 28 is physically connected to the network 11*a*, i.e. what particular network jack 300*a* is used. For example, the user can take their communications device 28 with them on a trip, and wherever they connect to the Internet, they can receive incoming calls. Accordingly, operation of VoIP is location independent and only an Internet/Ethernet connection is needed to get a registered connection to a VoIP provider, further described below.

Referring to FIG. 1, there are many examples of the communications device 28 suitable for facilitating voice communication (e.g. VoIP) over the network 11*a*. One example of the communications device 28 is an analog telephone connected to an ATA (Analog Telephone Adaptor), which is coupled to the network jack 300*a* via the adapter 30. The ATA provides for a standard phone to be connected to the network 11*a* (e.g. Internet) connection (e.g. network server 22) for use with VoIP. For example, voice service providers like Vonage™ and AT&T CallVantage™ bundle ATAs with their service.

A further example of the communications device 28 are IP Phones, which are specialized phones that look like normal phones with a handset, cradle and buttons. The IP phones can have an RJ-45 Ethernet connector for connecting directly to the network 11*a*, via the adapter 30, instead of having the standard RJ-11 phone connectors. IP phones are configured to be coupled with the network server 22 and have all the hardware and software onboard to handle voice communications using IP protocols and/or SIP for the call (e.g. call data 26). The communications device 28 can also be an IP enabled printer or facsimile machine for communicating text/image/video/audio data 26.

A further example of the communications device 28 is a computer configured for VoIP communications, using VoIP software, a microphone, speakers, a sound card and an Internet connection via the network server 22 (e.g. via a cable or DSL modem). A further example of the communications device 28 is a PDA that communicates through one of the adapters 30. The communications device 28 can also be a computer configured for message communication of data 26, 27*a* other than call data over the networks 11*a*, 11*b*, e.g. a computer not configured/using for VOIP and instead using any network browser/FTP application for communication of the data 26, 27*a* (non-VOIP data) over the networks 11*a*, *b*. In this example, the network 11*b* is used as a backup network in the case of data 26 communication problems on the network 11*a*, such that the data 26 is transformed by the adapter 30 into the formatted data 27*a* for communication to the unit 40 over the network 11*b*. It is recognised that the network 11*b* can be used as a backup network for sourcing of the power 25 to the communications device 28.

A further example of the communications device 28 is a powered device using data communication capabilities of the networks 11*a*, *b*, such as but not limited to a CCTV and a remote camera.

It is recognised that the communications device 28 can be embodied as a hardware endpoint or a software endpoint. Hardware endpoints are communication devices 28 with the look, feel, and shape of a traditional telephone, but can use IP, SIP, H.323 and RTP for communication. Some of these hardware endpoints can use Electronic Numbering (ENUM) or DUNDi to translate existing phone numbers to SIP addresses using DNS, so calls to other SIP users can bypass the telephone network. Software endpoints are also common which use a computer to emulate the voice/video functionality of a phone, such as but not limited to; Microsoft Windows Messenger, iChat AV, Twinkle, Ekiga, Kphone, and other GPL applications.

The communication device 28 has the device identity assigned, which is associated with each of the calls (e.g. call data 26) that interact with the communication device 28. One example of this device identity is the MAC address (Media Access Control), which represents the communication device's 28 name (e.g. ID) on a LAN. An Ethernet MAC address can be a six-byte number, usually expressed as a twelve digit hexadecimal number (Example: 1AB4C234AB1F). The MAC address is used by the Media Access Control sublayer of the Data-Link Layer (DLC) of telecommunication networking protocols. There is a different MAC sublayer for each physical device type. Also known as the hardware address or Ethernet address, the MAC address is a unique identifier specific to the network card inside the communications device 28 that allows the DHCP registration process to authenticate that the communications device 28 is allowed to access the network 11a. In general, MAC Addresses are of the form XX-XX-XX-XX-XX-XX, where the X's are digits and/or letters from A to F. The MAC address makes the communications device 28 recognizable to and distinguishable from other communications devices 28, as an identity code built into every Ethernet card, which uniquely identifies that card from all others in the world. The MAC addresses can either be "universally administered addresses" or "locally administered addresses", such that a universally administered address (sometimes called "burned-in address") is uniquely assigned to a communication device 28 by its manufacturer. It is recognised that the device ID can be always unique to facilitate identification of a particular communications device 28.

ARP (Address Resolution Protocol) is used to convert from addresses in a layer 3 protocol such as Internet Protocol (IP) to the layer 2 MAC address. On broadcast networks 11a, such as Ethernet, the MAC address allows each communications device 28 to be uniquely identified and allows data 26 communicated over the network 11a to be marked for specific communications devices 28 via the network 11a connection point, i.e. the network jack 300a.

Power Mode Adapter 30

Figure 10A:
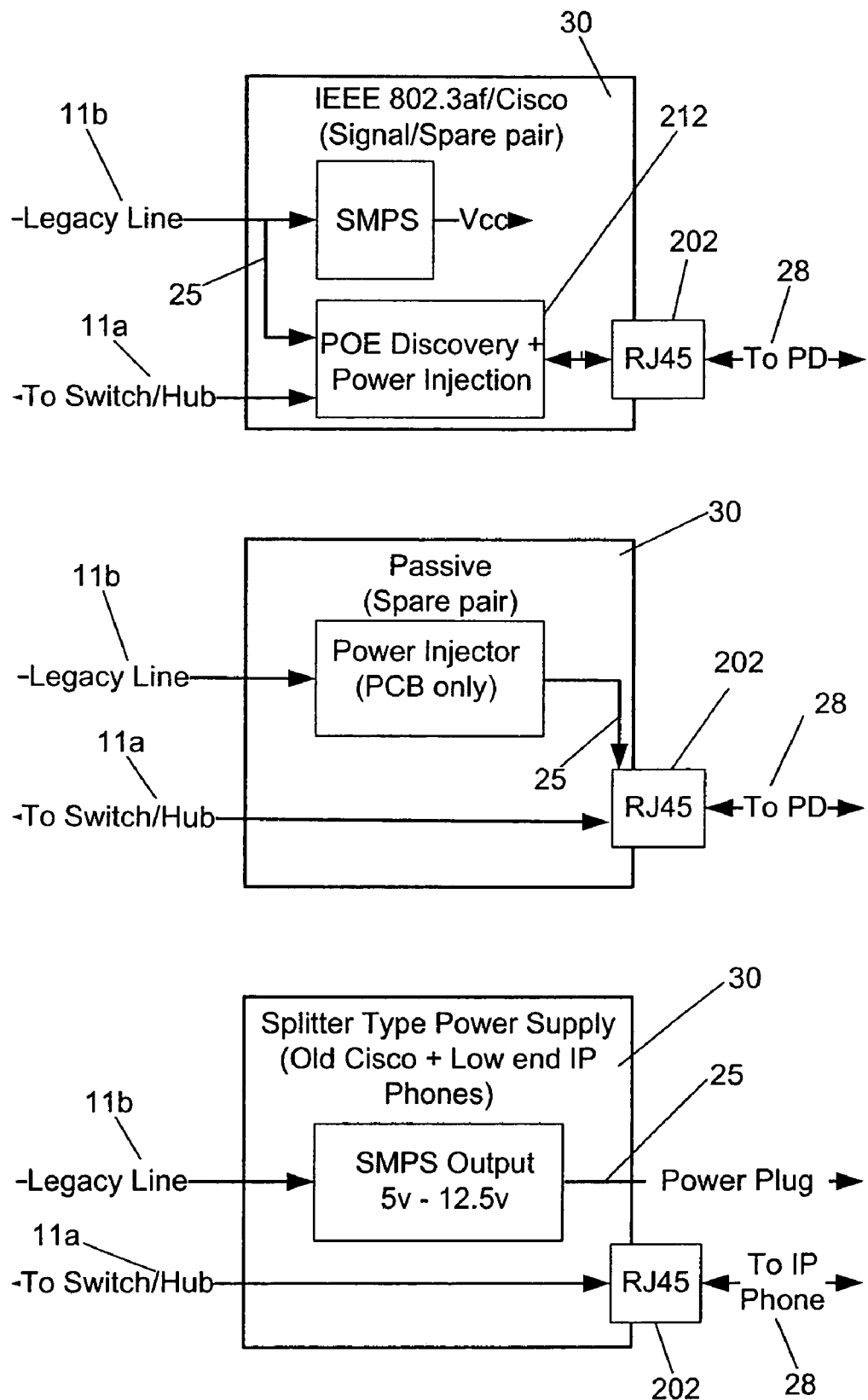
FIG. 10*a* shows different embodiments of supplying power via the adapter of FIG. 1.

Referring to FIG. 10a, the adapter 30 can be considered as a 3-port switch, for example, with 2 ports connecting to Ethernet (e.g. Primary) and one port connecting to a 2-wire interface (e.g. secondary). However, since switch can imply routing, in the context of providing power one port provides power and other ports are used for data, such that routing may not be done (i.e. optional). For example, port 200b could be providing power 25 while data 26 is transported between ports 200a and 202. The 2-wire interface can function as an Ethernet extender, rubber-banding the Ethernet packets (e.g. data 26) over 2-wires. The 2-wire interface can use HPNA, DSL, AMI or other proprietary protocol. The front end port 202 can have an Ethernet interface to connect to Ethernet devices like PCs and IP Phones (e.g. communication devices 28). The backend ports 200a, b can consist of two interfaces: a primary Ethernet 200a and a secondary 2-wire interface 200b for connecting to the respective networks 11a, b. In an alternative embodiment, referring to FIG. 5a, the adapter 30 can consist of a 2-port design, using port 200b to connect to the network 11b and port 202 to connect to the communications device 28.

Figure 9A:
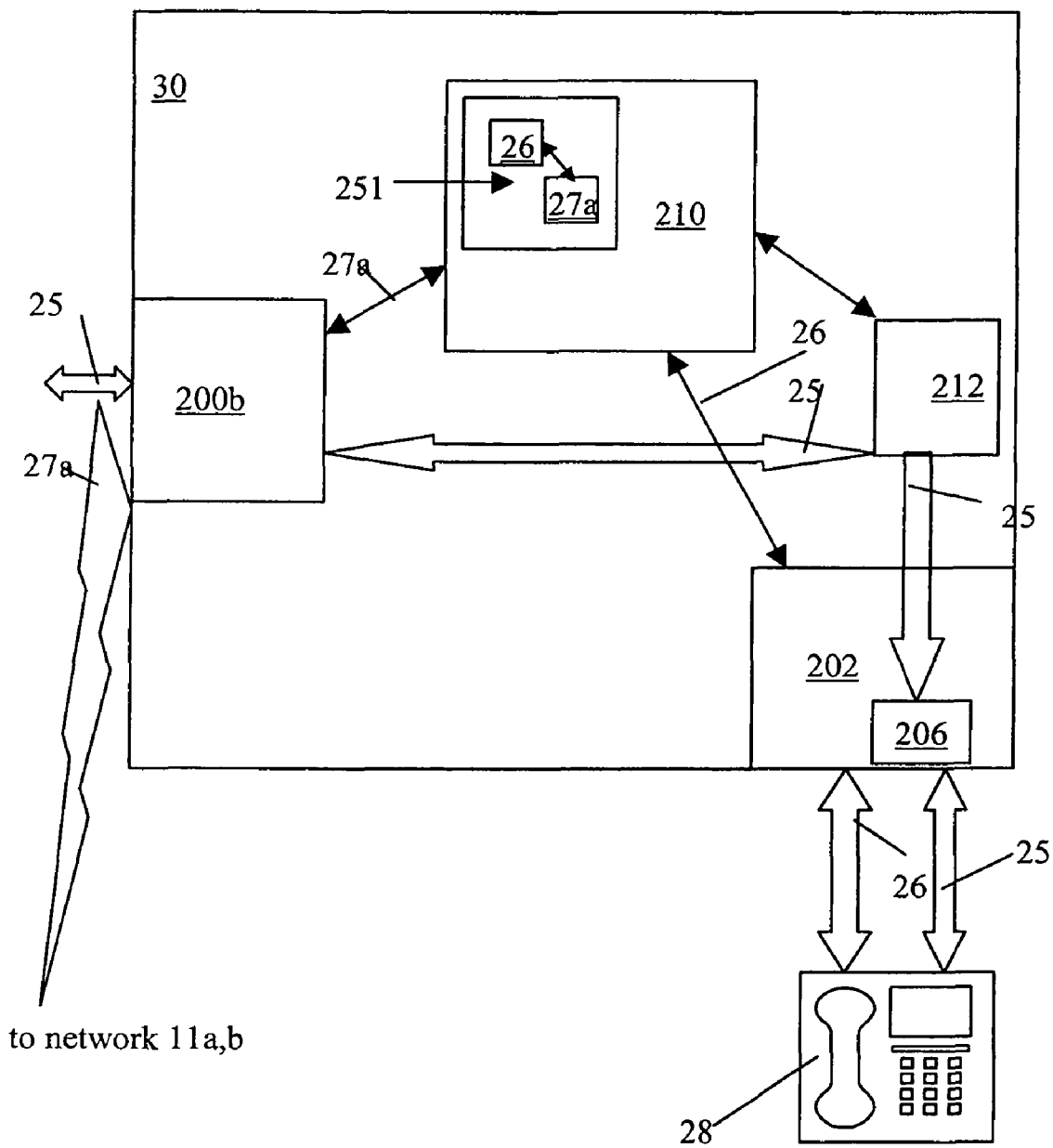
FIG. 9*a* is an example embodiment of the adapter of FIG. 1.

Referring to FIGS. 1 and 9a, b, shown is the communication mode adapter 30 for facilitating the flow of call data 26 between the communications network 11a and the communications device 28 (either directly or via the network 11b), and the supply of power 25 via the telephone network 11b to the communications device 28. The adapter 30 has the optional network port 200a (shown in FIG. 9b) for coupling to the communications network 11a (e.g. Ethernet), the telephone port 200b (or ports in the case of multiple dedicated telephone lines/numbers—not shown) configured for coupling to the telephone network 11b (e.g. analogue/digital telephone two-wire communication) and one or more device port(s) 202 for coupling to the communications device(s) 28. It is recognised that the device port 202 can be configured for communicating with the communications device 28 in the packet-based data 26 format as used by the communications device 28.

Optionally, the adapter 30 (see FIG. 9b) can have a switching module 204 for connecting the port 202 to either the network port 200a or the telephone port 200b, as further described below, in the case of the 3-port embodiment, thus providing for communication of data 26 over the network 11a or data 27a over the network 11b. The adapter 30 also has a translation module 251 (e.g. containing the modems 250, 252) for translating between a first communication protocol (e.g. packet-based for the call data 26) for the communications network 11a and a second communication protocol (e.g. POTS/xDSL for the telephone 2-wire communications data 27a) for the telephone network 11b. The adapter 30 can also have a power discovery module 212 for managing power requirements of the adapter 30 as well as any inline power (e.g. POE) used in operation of the communication devices 28. The adapter can also have a command module 210 for monitoring the state of the switching module 204, as well as the configuration of the ports 200a, b, 202 and/or the operation of the power discovery module 212.

Data 26 Communication

Figure 9B:
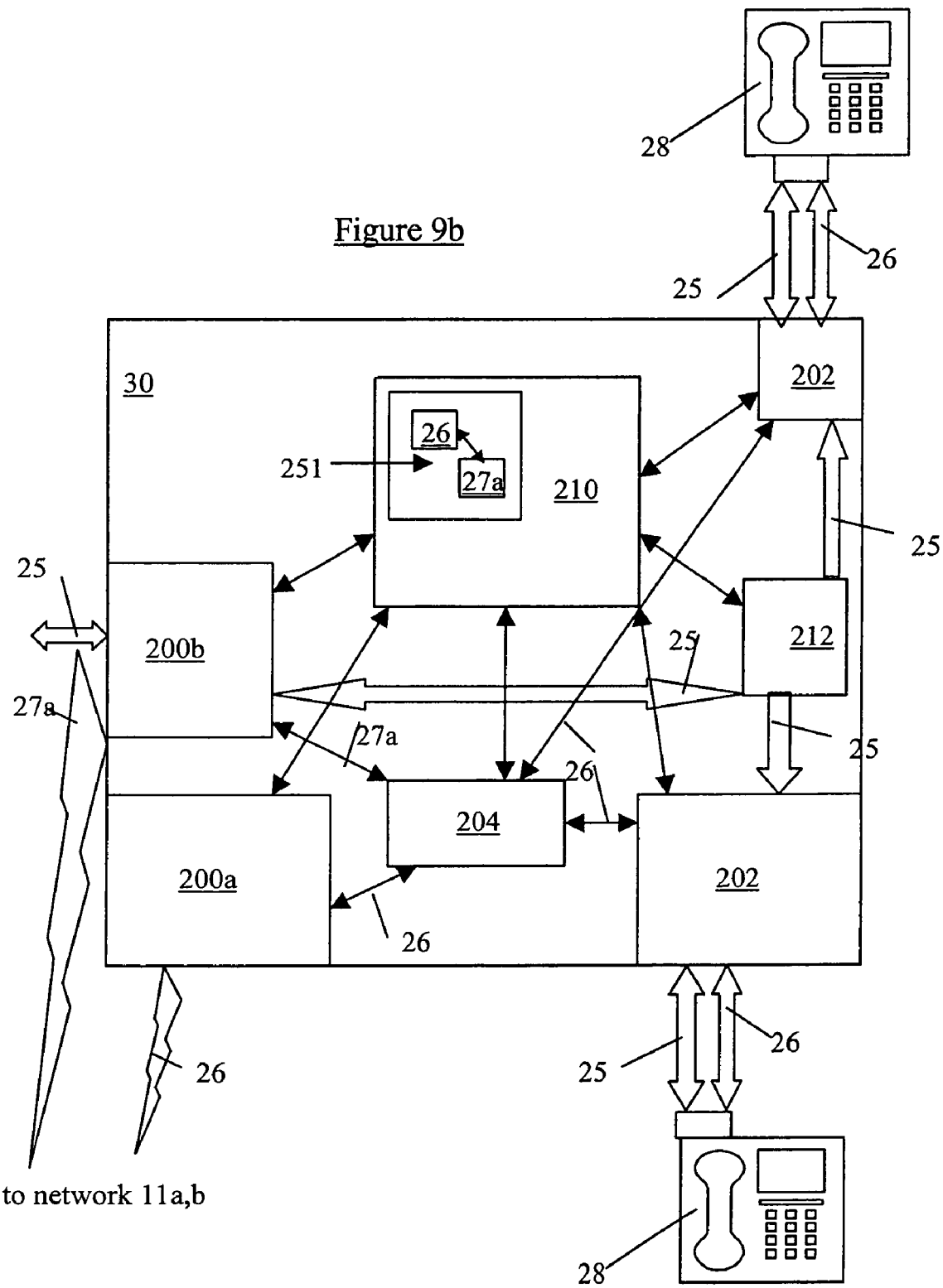
FIG. 9*b* is a further embodiment of the adapter of FIG. 1.

Referring to FIG. 9b, shown is the adapter 30 having the network port 200a for coupling the adapter 30 to the network 11a (e.g. an intranet) and the device port 202 for connecting to a communications port of the communications device 28. It is recognised that the device port 202 could incorporate the functionality of the switching module 204, as desired. The ports 200a, 202 are configured so as to facilitate the communication of any data 26 (e.g. data packet(s)) entering any port to be broadcast out on every/selected port other than the port of entry. For example, the adapter 30 communicates all data 26 received from the network 11a via the network port 200a to the device port 202 and vice versa. It is recognised that the adapter 30 can operate similar to a hub in that the adapter 30 forwards all data 26 in both directions between the ports 200a, 202, or the adapter 30 can use the switching module 204 for directing the data 26 between one or more ports 200a and/or ports 202, as desired. It is recognised that the data 26 formats can be the same or similar for the ports 200a, 202 in that they are configured as packet-based communications that are suitable for operation with the communications device 28 and the network 11a.

One example operation of the adapter 30 for data 26 communication is as a passive hub that serves as a conduit for the data 26, enabling that data 26 to go from the communications device 28 (or segment) to the network server 22 via the network 11a (e.g. from port 202 to port 200a) and vice-versa. The adapter 30 can also have features of an intelligent/manageable hub for monitoring the data 26 traffic passing through the adapter 30 and to configure the switching module 204 and/or respective ports 200a, b, 202 accordingly, as further described below. Another example operation of the adapter 30 for data 26 communications is as a switching hub, which can actually read the destination address (e.g. for a networked device coupled to the network 11a external to the environment 20) of each data 26 packet (or group of packets) and then forward the data 26 packet to the correct port 200a, b, 202. This selective routing (e.g. by MAC address) can be done by the central unit 40 instead, while the switching between Ethernet and 2-wire (e.g. ports 200*a* and 200*b*) by the adapter 30 is based on network conditions (e.g. network 11*a*, *b* outage) or a command. Regarded in the switching aspects, adapter 30 can also include a router, as desired.

It is recognised that in the case of wireless communications, the adapter 30 can have the device port 202 configured as a short-range wireless communication module, such as but not limited to Bluetooth™ technology, facilitating transmission of signals over short distances between communication devices 28 and the adapter 30 without the use of wires. The short-range wireless module can provide functionality similar to a cable or infrared connections for communication of data 26 between the communication devices 28 and the network 11*a* connection adjacent to the communication device 28. For example, the short-range wireless module can be compatible with bandwidth capabilities of between 500-2000 kbits and a range of approximately 1-5-10 meters. It is recognised that line-of-sight may not be required between the devices for the short-range wireless communications of the data 26. For example, Bluetooth transmits in the frequency range 2.4 to 2.4835 GHz and achieves data rates of up to 721 kilobits per second for ranges of up to 10 meters. The short-range wireless communication module can facilitate radio interfacing between the devices 28 and the adapter 30.

In any event, it is recognised that the adapter converts the format of the call data 26 to that of call data 27*a* suitable for communication over the network 11*b*, when the port 202 is connected to the port 200*b*. It is recognised that alternatively, the call data 26, 27*a* could be just data used for applications other than VOIP.

Power Discovery Module 212

Referring again to FIGS. 9*a, b*, 12, 13, the adaptor 30 is connected to the power 25 via the network 11*b*, for facilitating operation of the adaptor 30 as well as for providing inline power 25 to the communications device 28 via the port 202. Accordingly, the adaptor 30 has access to power 25 via the tip and ring connections of the network 11*b* for operation of the adaptor 30 and/or the communications device 28. The device port 202 provides the delivery of power 25 for operating the communications device 28, as well as for facilitating optional communication of the data 26 to/from the network 11*a* and/or 11*b*. For example, the discovery module 212 can incorporate an independent power supply to act as a POE injector, having the data port 200*b*, the device port 202 (data 26 plus power 25 port) and the separate power supply (not shown) for providing power 25 or additional energy to supplement the power 25 obtained over the network 11*b*. It is recognised that switching circuitry of the switching module 204 and/or the power discovery module 212 can be used to coordinate the power 25 supplied by the network 11*b* to the communications device 28, as desired.

Switching Module 204

Referring again to FIG. 9*b*, the switching module 204 can be used to switch the flow of data 26 and/or power 25 from the device port 202 to either of the network ports 200*a*, 200*b*, depending on the configuration and/or state of the networks 11*a, b* as monitored by the command module 210 or in response to external commands such as SNMP. It is recognised that the power coupling module 213 can be part of the switching module 204, as desired.

Command Module 210

It is recognised that a command module 210 could also monitor the data 26/27*a* of the ports 200*a, b* and/or power 25 communications of the port 200*b* of the adapter 30 of FIG. 9*b*. Further, the command module 210 (for example in conjunction with the translation module 251) can contain logic to translate between Ethernet and 2-wire communication protocols. The command module 210 (for example in conjunction with the switching module 204) can also contain switching logic to switch between two backend interfaces: the primary Ethernet port 200*a* and secondary 2-wire port 200*b*, for example. The switching can be triggered by one of the following events, such as but not limited to: a message or command from an external source; monitoring logic within the command module 210 and/or the ports 200*a, b*, 202 themselves that detects power 25 and network 11*a, b* outages; and monitoring logic within the command module 210 and/or the ports 200*a, b*, 202 themselves that detects network 11*a, b* data communication overloads and/or routing inefficiencies/inconsistencies.

For example, other functionality monitored by the command module 210 can include trigger logic, whereby switching between the ports 200*a*, 200*b* can be triggered by messages/commands from external sources (e.g. administration server 24) or by network monitoring logic within the adapter 30 itself. The adapter 30 is capable of responding to management commands (e.g. SNMP) from monitoring, analysis or other management software that can be implemented by the command module 210 and/or configured into the ports 200*a, b*, 202 themselves. The management commands could indicate the routing choice: primary 200*a* or secondary 200*b* ports, for example, for the call information contained in the data 26, 27*a*. On receiving a command, the adapter 30 would switch the data 26, 27*a* traffic to the requested route if it is different from the current route. In terms of network congestion, the adapter 30 can continuously monitor the data 26, 27*a* traffic and if the command module 210 detects delays above a pre-determined threshold value, the data 26, 27*a* from that point on could be rerouted to the 2-wire backup interface port 200*b*, and optionally a notification is sent to a management server (e.g. administration server 24). In this mode, the adapter 30 could continue to route the data 26, 27*a* over the selected alternate interface port (e.g. secondary 200*b* for all call data 26 once translated into the communication data 27*a* format, or example) until the adapter 30 receives a command to revert to the initial interface (e.g. primary 200*a* for all call data 26 that may not need any translation for communication over the network 11*a* as received from the communications device 28). Further, it is recognised that in terms of hardware, the adapter 30 can perform low-level monitoring of the signalling on the main interface (e.g. port 200*a, b*) to determine corresponding network 11*a, b* or power 25 outages. When the adapter 30 senses a hardware failure that could be the result of a network 11*a, b* or power outage on the main interface (e.g. network jack 300*a*), the adapter 30 can reroute the data 26 traffic to the selected secondary interface (e.g. network jack 300*a*), thus switching power 25 sourcing from the port 200*a* to the port 200*b* or from the port 200*b* to the port 200*a*).

In view of the above, it is recognised that the adapter 30 can be hardware, software, or a combination thereof. In particular, the ports 200*a, b*, 202 and modules 204, 251, 210, 212 can also be embodied as hardware and/or programmed instructions (e.g. software), as desired, in order to individually and/or cooperatively perform the above mentioned functionality of the adapter 30.

In view of the above, it is recognised that the adapter can be configured to supply via the network 11*b* the power 25 used by the communications module 28, while either communicating the data 27*a* over the network 11*b* or the data over the network 11*a*, as configured.

Adapter 30 Examples

Referring to FIG. 10*a*, shown are three different embodiments of the adapter 30, including various versions of usage of the tip and ring connections of the network 11*b* lines for providing power 25 to the communications devices 28.

Figure 10B:
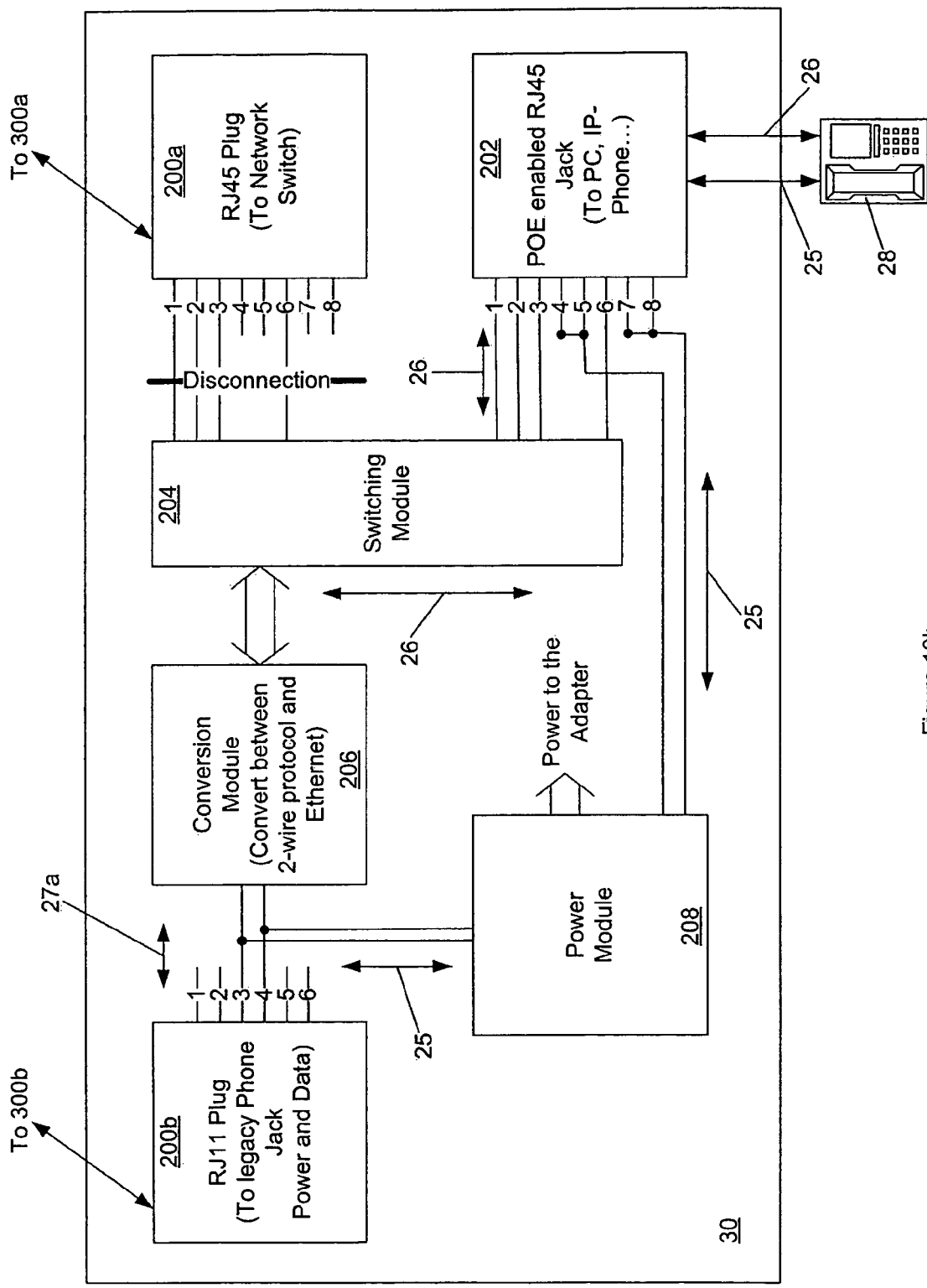
FIG. 10*b* shows connections between the ports of the adapter of FIG. 1.

Referring again to FIGS. 9*a*, *b* and 10*b*, *c*, *d*, the switching module 204 can be used to switch the flow of data 26 (and/or power 25) to/from the device port 202 to either of the network ports 200*a*, 200*b*, depending on the configuration of the networks 11*a*, *b* as monitored by the command module 210. Referring to FIG. 10*b*, shown are example connections between the port 200*b* and the port 202 and disconnections between the port 200*a* and the port 202, as made by the switching module 204. It should be noted that the power 25 can be supplied from the tip and ring connections (e.g. 3-4) of the port 200*b* to the spare connections 4-5 and 7-8 of the device port 202. Accordingly, the power 25 for the port 202 can be supplied from the network 11*b* while the data 26 of the device 28 is converted (into the data format 27*a* by the translation module 206) and then redirected from connections 1, 2, 3, 6 of the port 202 over the connections 3-4 of the network port 200*b* as communication data 27*a*, e.g. as data carried over DC. Accordingly, data 26 is routed by the switching module 204 between the communications device 28 and the network jack 300*b* (e.g. RJ11 Plug) via the conversion module 206. At this stage, both data 27*a* and power 25 can be transported over 2-wire. This switching enables existing data communication cabling (i.e. network 11*b*) to supply inline power 25 obtained from the network 11*b* as well as to facilitate communication of the data 26 as data 27*a* to the unit 40. It is noted that the data 26 from the communications device 28 on connections 1, 2, 3, 6 of the port 202 is switched from the connections 1, 2, 3, 6 of the port 200*a* to the tip and ring connections (e.g. for 4 pin connections 2, 3, for 6 pin connections 3, 4 and for 8 pin connections 4, 5) of the port 200*b* as converted data 27*a* and vice versa.

Figure 10C:
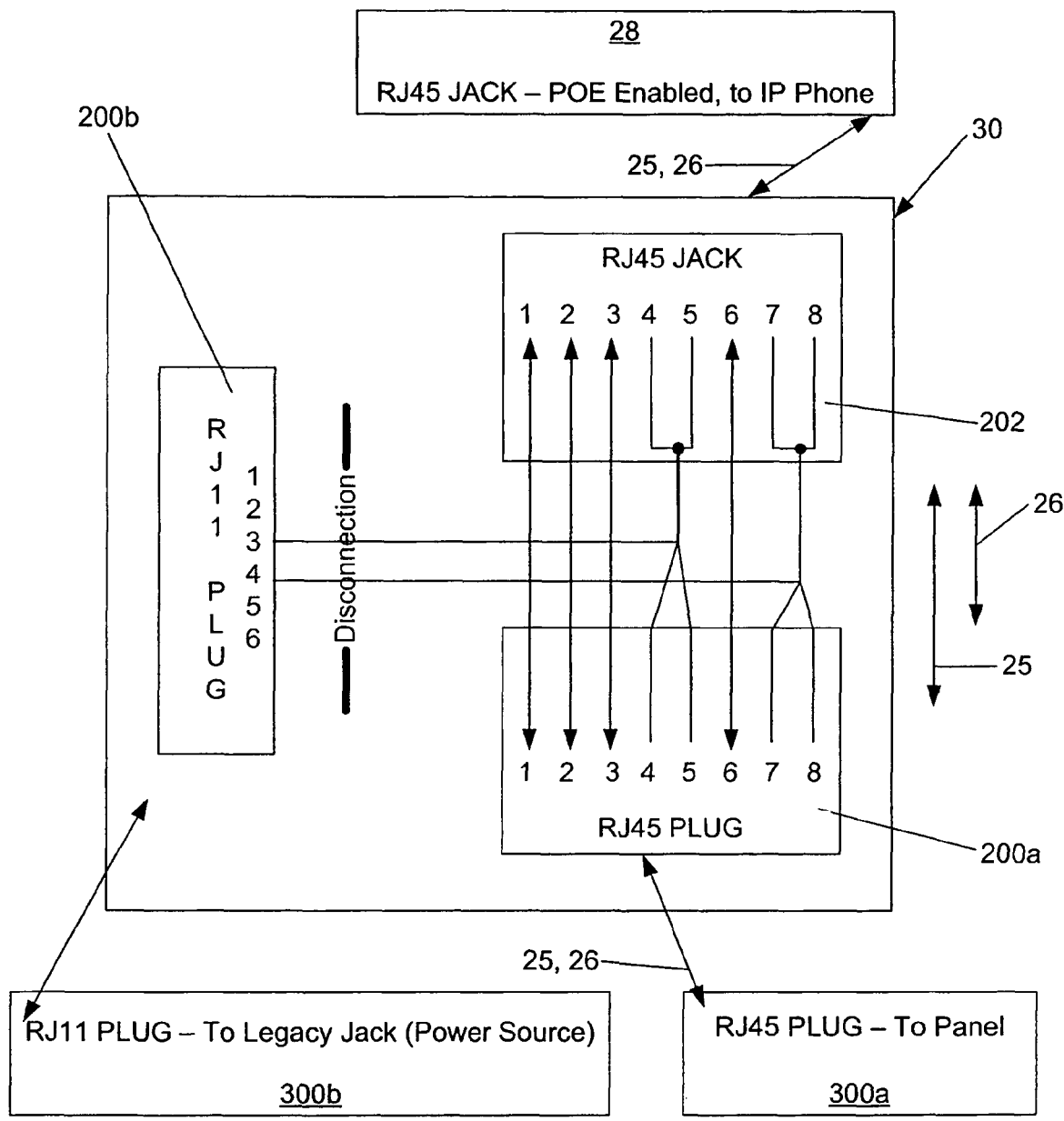
FIG. 10*c* shows an alternative embodiment of the adapter of FIG. 10*b*.

Further, it is recognised that the power 25 can continue to come from the network jack 300*a* while the data 26 is transmitted as transformed data 27*a* via the network jack 300*b*, as desired. Further, referring to FIG. 10*c*, the 2-wire is disconnected for data 26 and the data 26 is rerouted between the device port 202 (e.g. RJ45 Jack) and the network jack 300*a* (e.g. RJ45 Plug) through the switching module 204, while the power 25 is also sourced from the network jack 300*a* via the power module 208.

Figure 10D:
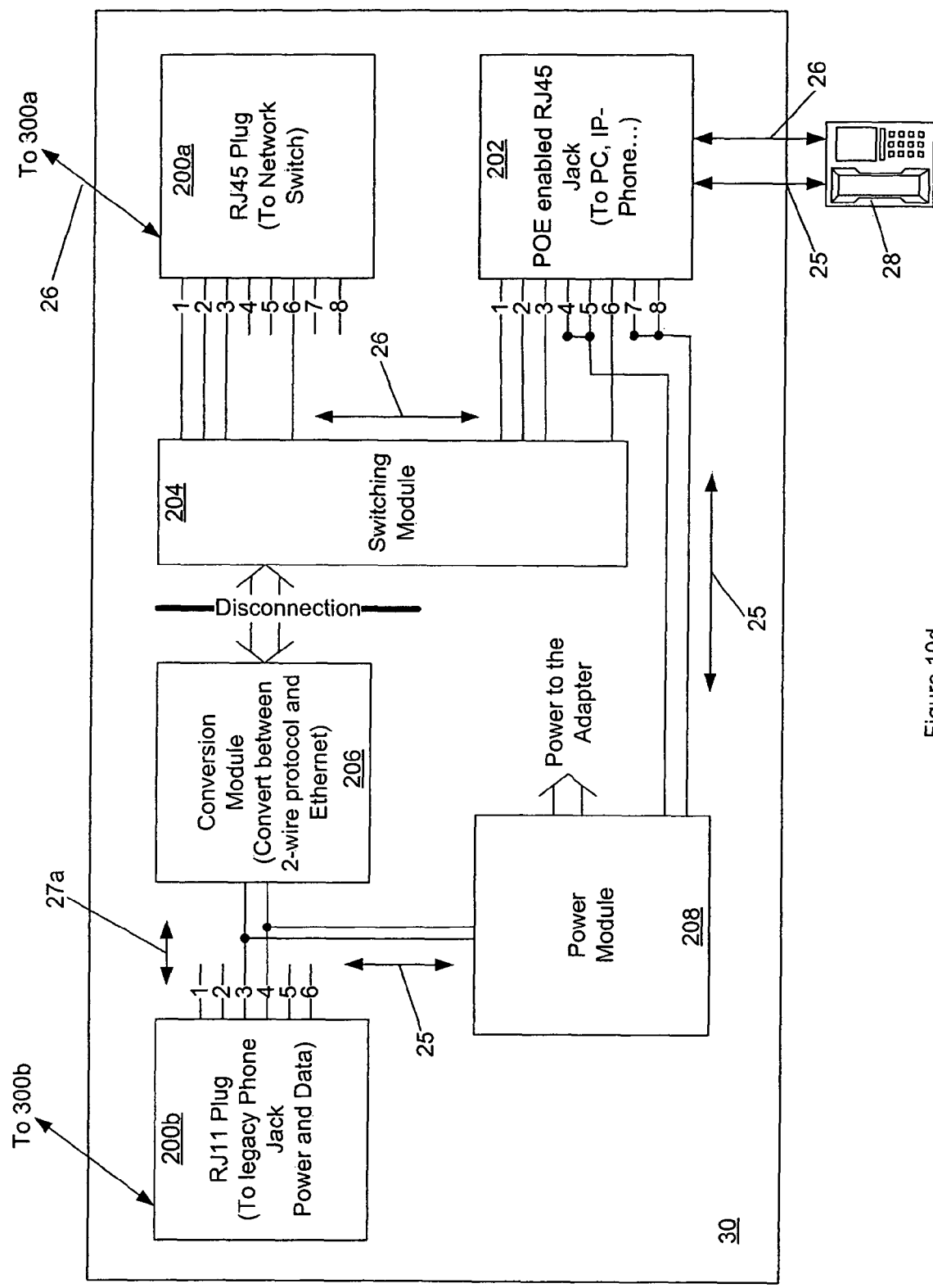
FIG. 10*d* shows an alternative embodiment of the adapter of FIG. 10*b*.

This is compared to FIG. 10*d*, showing the disconnection of the connections 1, 2, 3, 6 of the ports 200*b* by the switching module 204 and the coupling made between connections 1, 2, 3, 6 of the port 200*a* with the corresponding connections 1, 2, 3, 6 of the device port 202, with the connection of the connections 3, 4 of the port 200*b* with the connections 4, 5, 7, 8 of the port 202, thus facilitating the communication of inline power 25 from the network 11*b* and the call data 26 with respect to the network 11*a*. In this switching case, it is recognised that there may be no conversion of the data 26 involved and therefore data 26 flows directly from the network 11*a* to the communications device 28 and vice-versa.

Figure 10E:
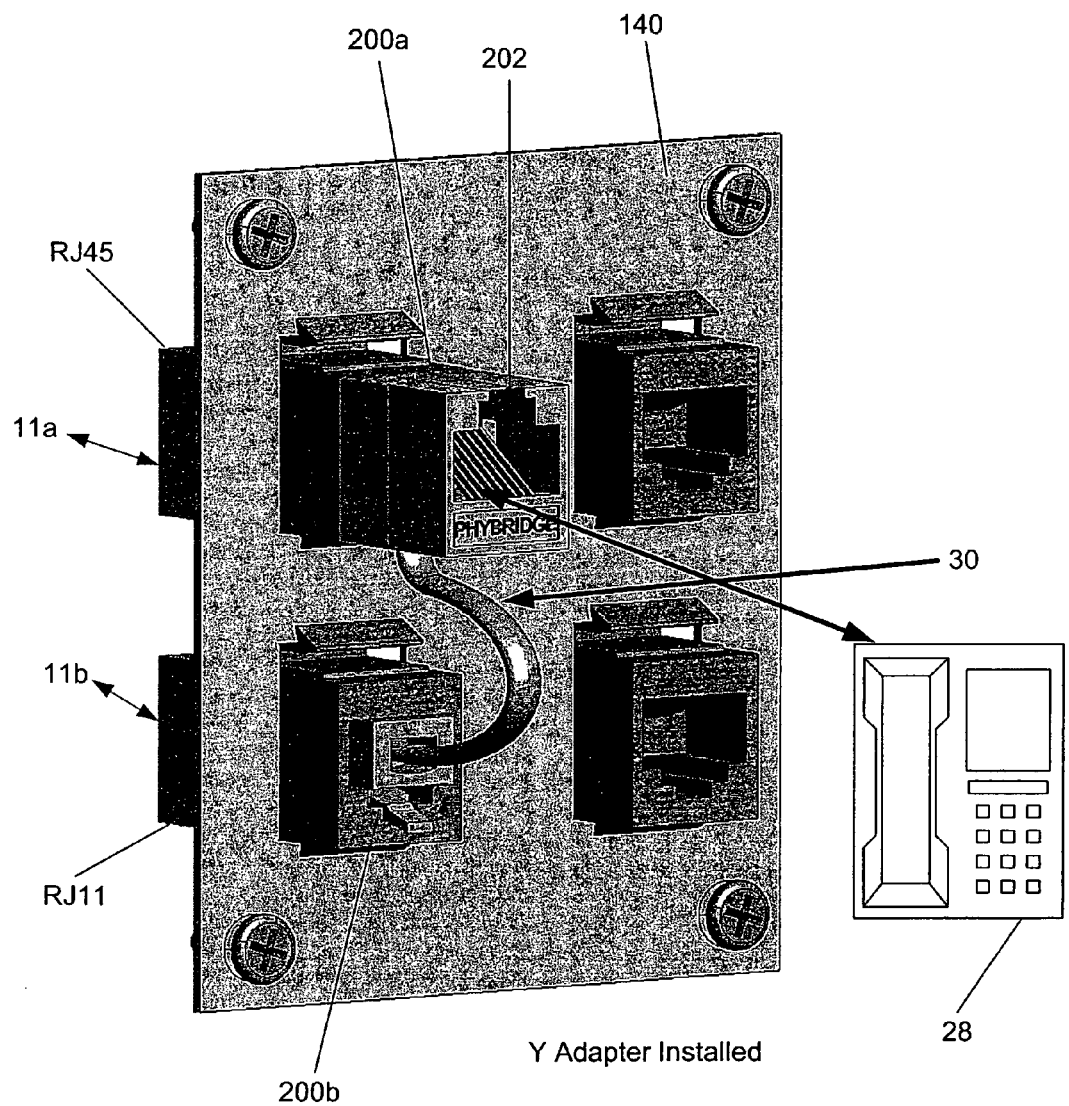
FIG. 10*e* shows an example implementation of the adapter of FIG. 1.

Referring to FIG. 10*e*, the adapter 30 is mounted on the front of a faceplate 140 that is in turn connected to the intranet 11*a* connected to the network server 22 and the network 11*b* connected to the PBX directly (not shown) or optionally through the unit 40 (see FIG. 7*a*), as desired. In a second embodiment (not shown), the adapter 30 can be mounted on the rear of the faceplate 140 and thus connected to both of the networks 11*a*, *b*. It is also recognised that the adapter 30 could be integrated into the design of the faceplate 140, as desired.

In view of the above, it is recognised that the adapter 30 can be used as a backup system for power 25 and/or data 26, 27*a* communication in the event of power or LAN failure (e.g. failure of one of the networks 11*a*, *b*). In case of LAN overload, switching of power/data from one port 200*a*, *b*, to the other port 200*a*, *b* can be done dynamically due to identified network 11*a*, *b*, problems. The switching of the power/data onto the secondary network 11*a*, *b* can be controlled by monitoring software and/or hardware of the adapter 30 that detects link down. The adapter 30 can also be used for analysis before migrating to a converged network.

Further, it is also recognised that the adapter 30 can be used as a supply of the power 25 to enable the operation of powered communication devices 28 over cabling that does not have existing inline power capabilities.

Further, to the user of the communication devices 28, operation of the adapter 30 (when connected to both of the port types 200*a*, *b*) can be no different from a regular RJ45 or other network jack. The adapter 30 can support packet based communications over Legacy lines; packet based communications over LAN with Legacy lines as backup; and packet based communications over LAN.

Further, in the case of a downed network 11*a*, *b* (e.g. downed LAN 11*a* as a result of power outage or equipment failure or loss of data signalling), the adapter 30 can independently of the LAN provide power 25 supplied from the power module 212 and/or from the conversion unit 40 (e.g. the unit 40 provides the power 25 suitable for operation of the communication device 28 and routes data 26 over the legacy lines as telephone data 27*a* using a digital 2-wire protocol). In the event that the telephone 31 service is interrupted, the adapter 30 can route telephone communications 27*b* as converted call data 26 over the network 11*a* (as well as supply any needed operating power 25 to the telephones 31).

It is recognized that in view of the above, the adapter 30 can also be configured to convert the communications format of the data 26 to the communications format of the, data 27*b* (e.g. analogue—POTS) using a packet-based to dial-up based format conversion process, for example. It is recognized that in the event of using dial-up for communication of the data 26 over the network 11*b* as data 27*b*, the corresponding network jack 300*b* (and communications device 28) would use the dedicated phone number/line assigned to that network jack 300*b*. In other words, the statically assigned network 11*b* telephone number/line (e.g. a physical dedicated telephone number/line) of the telephone network jack 300*b* would provide the network 11*b* entry point for the coupled communications device 28, for the adapter 30 using the data 27*b* format.

It is also recognised that in view of the above, the call data 26, 27*a* could also be any other form of digital data that is communicated between computers connected to the networks 11*a*, *b*. For example, the data 26 could be data messaging (request response messages) between two or more computers connected via the networks 11*a*, *b* that does not involve the use of the computer as an IP phone (e.g. email messages and Internet browser based messaging and associated data transfers).

Accordingly, the adapter 30 allows the communications device 28 to transparently operate over the LAN network 11*a* via one of two paths. The secondary (e.g. 2-wire path) network 11*b* uses a different protocol from that of the primary (e.g. Ethernet) protocol of the network 11*a*. To the communications device 28, it makes no difference which path is being used to connect to the network via the device port 202; the communications device 28 just knows that it's still on the network via the device port 202 regardless of the type of connection. The network 11*b* (using tip and ring connections e.g. 2-wire) connection can be transparent to the communications device 28, so to the communications device 28 it is no different from being connected directly over network 11*a*.

Internally, the conversion/transformation of the data 26 format to the data 27a format is done on the network 11b between the adapter 30 and the unit 40, and as such may not be visible from the network 11a and communications device 28 external to the network 11b.

Like the adapter 30, the central unit 40 converts data between the primary and secondary communication protocols (e.g. Ethernet and 2-wire formats) in such a way as to make the communication devices 28 function with respect to data 26 communication to and from the device 28 as it would when directly on the network 11a (e.g. Ethernet), irrespective of the data path. Further, the central unit 40 aggregates data 26, 27a from the different communication end points (from the network 11a and from the network 11b) for transportation over the LAN and distributes data from the LAN to specific end-points based on the MAC/network 11a address of the communications device 28. Further, it is recognised that the central unit 40 and/or the adapter 30 is capable of providing power 25 to the communication devices 28 via the network 11b. In terms of polarity, it is recognised that a full wave rectifier could be used in the adapter 30 to account for any polarity mismatch in connection of the adapter 30 and associated communication device 30 to unit 40 via the network 11b.

In view of the above, it is recognised that the modules of the adapter 30 and the unit 40 can be configured other than as described, for example the functionality of two or more modules can be combined into a lesser number of modules or the functionality of one module can be further subdivided into additional modules.

We claim:

1. An adapter for coupling an inline powered communications device to a primary network and to a secondary network, the communications device configured for having an assigned device identification and configurable for using an assigned network address for use in routing data over either of the networks and receiving inline power from either of the networks, the adapter comprising:
    a first port having a device connector having device inline power and data connections for connecting to the communications device to facilitate the communication of the data and the inline power between the adapter and the communications device, the inline power for use in operating the communications device;
    a second port having a primary network connector having primary network inline power and data connections for connecting to the primary network to facilitate the communication of the data and the inline power between the primary network and the communications device via the first port, the second port coupled to the first port;
    a third port having a secondary network connector having secondary network inline power and data connections for connecting to the secondary network to facilitate the supply of the data and the inline power between the secondary network and the communications device via the first port, the third port coupled to the first port; and
    a module configured for redirecting a transmission path of the inline power between the first port and the third port when the inline power becomes unavailable from primary network via the second port, while maintaining a transmission path of the data between the device data connection and the primary network data connection, by decoupling the device inline power connection from the primary network inline power connection and coupling the device inline power connection to the secondary network inline power connection.

2. The adapter of claim 1 further comprising a power discovery module configured for performing a power initialization process to determine whether the communications device when connected to the first port is configured to receive the inline power.

3. The adapter of claim 1, wherein a power discovery module is in communication with the third port, the power discovery module is located externally to the adapter.

4. The adapter of claim 1, wherein the power discovery module is located in a control unit coupled to the adapter via the secondary network.

5. The adapter of claim 2, wherein the secondary network comprises a two-wire connections format for legacy telephone communications.

6. The adapter of claim 5, wherein the inline power when sourced via the third port is over the two-wire connections format using tip and ring connections of the secondary network.

7. The adapter of claim 6, wherein a communications format of the primary network is a packet-based format.

8. The adapter of claim 7, wherein the assigned network address is an IP address dynamically assigned to the communications device when said communications device is connected to the first port.

9. The adapter of claim 2, wherein the discovery module is configured for coordinating an appropriate power quantity of the inline power as a result of the power initialization process.

10. The adapter of claim 9, wherein the power initialization process includes a detection period for detecting the presence of a signature resistance in the communications device, a classification period for determining a power class level of the communications device, and a start-up period for beginning the supply of the inline power.

11. The adapter of claim 10, wherein the power coupling module uses passive coupling for the supply of the inline power between either the first port and the second port or between the first port and the third port.

12. The adapter of claim 2 further comprising a command module configured for coordinating the supply of the inline power from either of the networks as triggered by a trigger event selected from the group comprising:
    a switching message from a source external to the adapter; determining of a power outage for the operating power from the primary network; and determining of a network interruption of the primary network.

13. A method for coupling an inline powered communications device to a primary network and to a secondary network, the communications device configured for having an assigned device identification and configurable for using an assigned network address for use in routing data over either of the networks and receiving inline power from either of the networks, the method comprising the acts of:
    connecting to the communications device via a first port having a device connector having device inline power and data connections to facilitate the communication of the data and the inline power between an adapter and the communications device, the inline power for use in operating the communications device;
    connecting to the primary network via a second port having a primary network connector having primary network inline power and data connections to facilitate the communication of the data between the primary network and the communications device via the first port, the second port coupled to the first port;
    connecting to the secondary network via a third port having a secondary network connector having secondary network inline power and data connections to facilitate the supply of the data and the inline power between the secondary network and the communications device via the first port, the third port coupled to the first port; and redirecting a transmission path of the inline power between the first port and the third port when the inline power becomes unavailable from primary network via the second port, while maintaining a transmission path of the data between the device data connection and the primary network data connection, by decoupling the device inline power connection from the primary network inline power connection and coupling the device inline power connection to the secondary network inline power connection.

14. The method of claim 13 further comprising performing a power initialization process to determine whether the communications device when connected to the first port is configured to receive the inline power.

15. The method of claim 14, wherein the secondary network comprises a two-wire connections format for legacy telephone communications.

16. The method of claim 15, wherein the inline power when sourced via the third port is over the two-wire connections format using tip and ring connections of the secondary network.

17. The method of claim 16, wherein a communications format of the primary network is a packet-based format.

18. The method of claim 17, wherein the assigned network address is an IP address dynamically assigned to the communications device when said communications device is connected to the first port.

19. The method of claim 14 further comprising coordinating an appropriate power quantity of the inline power as a result of the power initialization process.

20. The method of claim 19, wherein the power initialization process includes a detection period for detecting the presence of a signature resistance in the communications device, a classification period for determining a power class level of the communications device, and a start-up period for beginning the supply of the inline power.

21. The method of claim 20, wherein passive coupling is used for the supply of the inline power between either the first port and the second port or between the first port and the third port.

22. The method of claim 14 further comprising coordinating the supply of the inline power from either of the networks as triggered by a trigger event selected from the group comprising: a switching message from a source external to the adapter; determining of a power outage for the operating power from the primary network; and determining of a network interruption of the primary network.

23. The method of claim 13, wherein the device identification is a MAC address.

24. The method of claim 23, wherein the communications device is selected from the group comprising: an IP phone; a computer configured for IP telephony; a computer configured for network communication; a powered device using data communication capabilities of the networks; and an analogue phone connected to an ATA.

25. The method of claim 24, wherein the data is selected from the group comprising: request messages; response messages; call data including voice data; and call data including voice and video data.

26. The method of claim 13 further comprising the step of providing operating power for the adapter using a portion of the inline power received over at least one of the networks.

27. An adapter for coupling an inline powered communications device to a primary network and to a secondary network, the communications device configured for having an assigned device identification and configurable for using an assigned network address for use in routing data over either of the networks and receiving inline power from either of the networks, the adapter comprising:

a first port having a device connector having device inline power and data connections for connecting to the communications device to facilitate the communication of the data and the inline power between the adapter and the communications device, the inline power for use in operating the communications device;

a second port having a primary network connector having primary network inline power and data connections for connecting to the primary network to facilitate the communication of the data and the inline power between the primary network and the communications device via the first port, the second port coupled to the first port;

a third port having a secondary network connector having secondary network inline power and data connections for connecting to the secondary network to facilitate the supply of the data and the inline power between the secondary network and the communications device via the first port, the third port coupled to the first port; and a module configured for redirecting a transmission path of the data between the first port and the third port when the data is unavailable from primary network via the second port, while maintaining a transmission path of the inline power between the device inline power connection and the primary network inline power connection, by decoupling the device data connection from the primary network data connection and coupling the device data connection to the secondary network data connection.

28. The method of claim 27 further comprising a translation module between the first port and the third port configured for translating a communications format of the data in communication of the data between the first port and the third port.

* * * * *